(12) United States Patent
Koizumi

(10) Patent No.: US 8,885,296 B2
(45) Date of Patent: Nov. 11, 2014

(54) CURRENT DRIVE TYPE MAGNETIC HEAD AND DISK DRIVE WITH THE SAME

(75) Inventor: Gaku Koizumi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 461 days.

(21) Appl. No.: 13/186,375

(22) Filed: Jul. 19, 2011

(65) Prior Publication Data

US 2012/0092787 A1     Apr. 19, 2012

(30) Foreign Application Priority Data

Oct. 15, 2010    (JP) ................................. 2010-232843

(51) Int. Cl.
*G11B 5/147*      (2006.01)
*G11B 5/187*      (2006.01)
*G11B 5/31*       (2006.01)
*G11B 5/127*      (2006.01)

(52) U.S. Cl.
CPC ............ *G11B 5/1278* (2013.01); *G11B 5/3116* (2013.01)
USPC .................................. 360/123.1; 360/125.29

(58) Field of Classification Search
CPC .. G11B 5/1278; G11B 5/3116; G11B 5/3136; G11B 5/315; G11B 5/3146; G11B 5/11; G11B 5/3123
USPC ............... 360/125.02, 125.27, 125.29, 123.1, 360/123.06
See application file for complete search history.

(56) References Cited

U.S. PATENT DOCUMENTS

| | | | |
|---|---|---|---|
| 5,801,910 A * | 9/1998 | Mallary .................... | 360/125.65 |
| 6,751,054 B2 * | 6/2004 | Sato et al. ................ | 360/125.06 |
| 6,836,957 B2 * | 1/2005 | Kobayashi ................. | 29/603.16 |
| 7,016,169 B2 * | 3/2006 | Yoshikawa et al. ...... | 360/324.12 |
| 7,397,632 B2 * | 7/2008 | Miyake et al. ........... | 360/125.12 |
| 7,440,230 B2 * | 10/2008 | Hsu et al. .................... | 360/125.3 |
| 7,948,714 B2 * | 5/2011 | Yin et al. ................... | 360/236.5 |
| 8,405,930 B1 * | 3/2013 | Li et al. ..................... | 360/125.08 |
| 8,470,185 B2 * | 6/2013 | Mino et al. ....................... | 216/22 |
| 2007/0058294 A1 * | 3/2007 | Gotoh ............................ | 360/126 |
| 2007/0127157 A1 * | 6/2007 | Nishiyama et al. ........... | 360/126 |

FOREIGN PATENT DOCUMENTS

| | | |
|---|---|---|
| JP | 03-049008 | 3/1991 |
| JP | 08-167122 | 6/1996 |
| JP | 2000-339621 | 12/2000 |
| JP | 2004-062946 | 2/2004 |

(Continued)

OTHER PUBLICATIONS

Japanese Office Action dated Sep. 27, 2011, filed in Japanese counterpart Application No. 2010-232843, 7 pages (with English translation).

*Primary Examiner* — Brian Miller
(74) *Attorney, Agent, or Firm* — Patterson & Sheridan LLP

(57) ABSTRACT

According to one embodiment, a magnetic head includes a magnetic core including a main pole, and a return pole opposed to the main pole with a magnetic gap therebetween, and configured to return magnetic flux from the main pole and form a magnetic circuit in conjunction with the main pole, a coil configured to excite magnetic flux in the magnetic circuit, and a nonmagnetic electrically conductive layer formed by disposing only a nonmagnetic material in the magnetic gap between the return pole and an end portion of the main pole on the recording medium side, and configured to electrically connect the main pole and the return pole. The main pole, the nonmagnetic electrically conductive layer, and the return pole are configured to constitute a series electrical circuit.

16 Claims, 26 Drawing Sheets

(56) References Cited

FOREIGN PATENT DOCUMENTS

| | | |
|---|---|---|
| JP | 2006-005308 | 1/2006 |
| JP | 2006-244692 | 9/2006 |
| JP | 2008-077723 | 4/2008 |
| JP | 2009-080904 | 4/2009 |
| JP | 2010-020835 | 1/2010 |

* cited by examiner

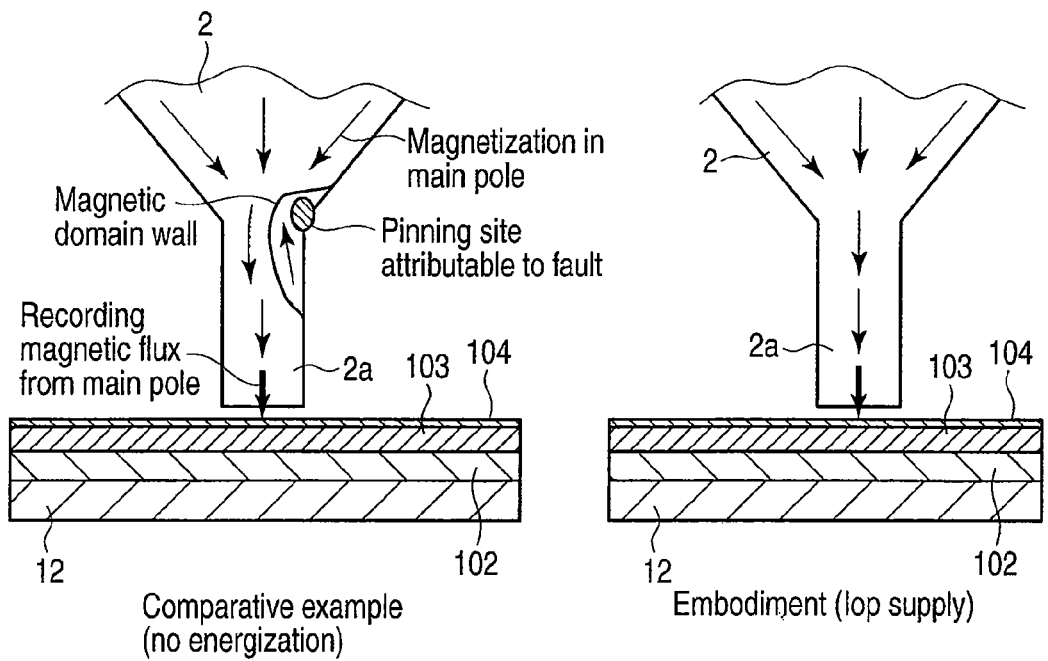
F I G. 8 A    F I G. 8 B
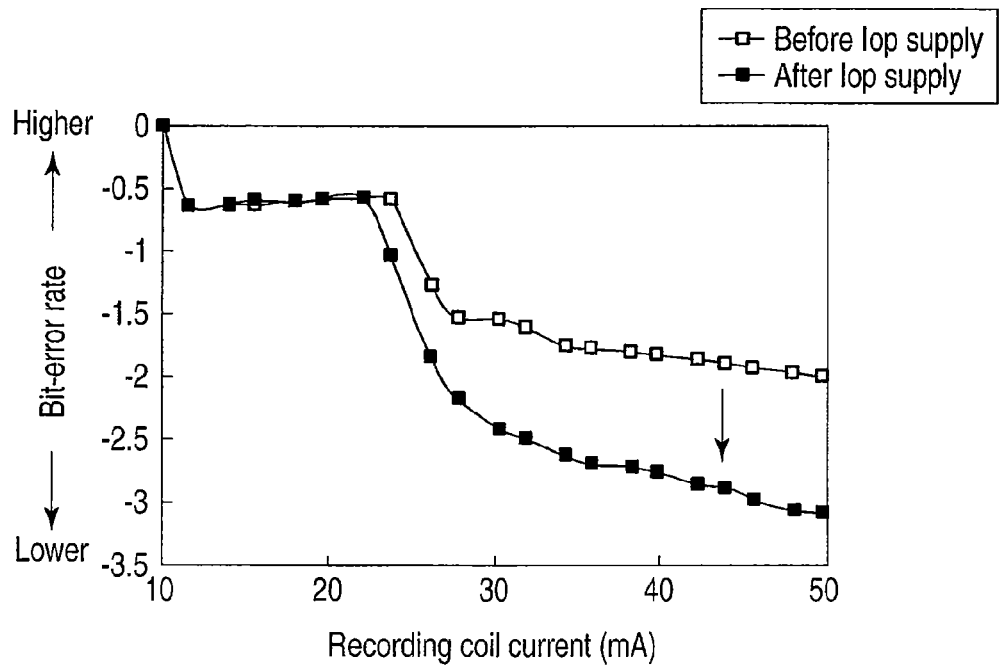
F I G. 9

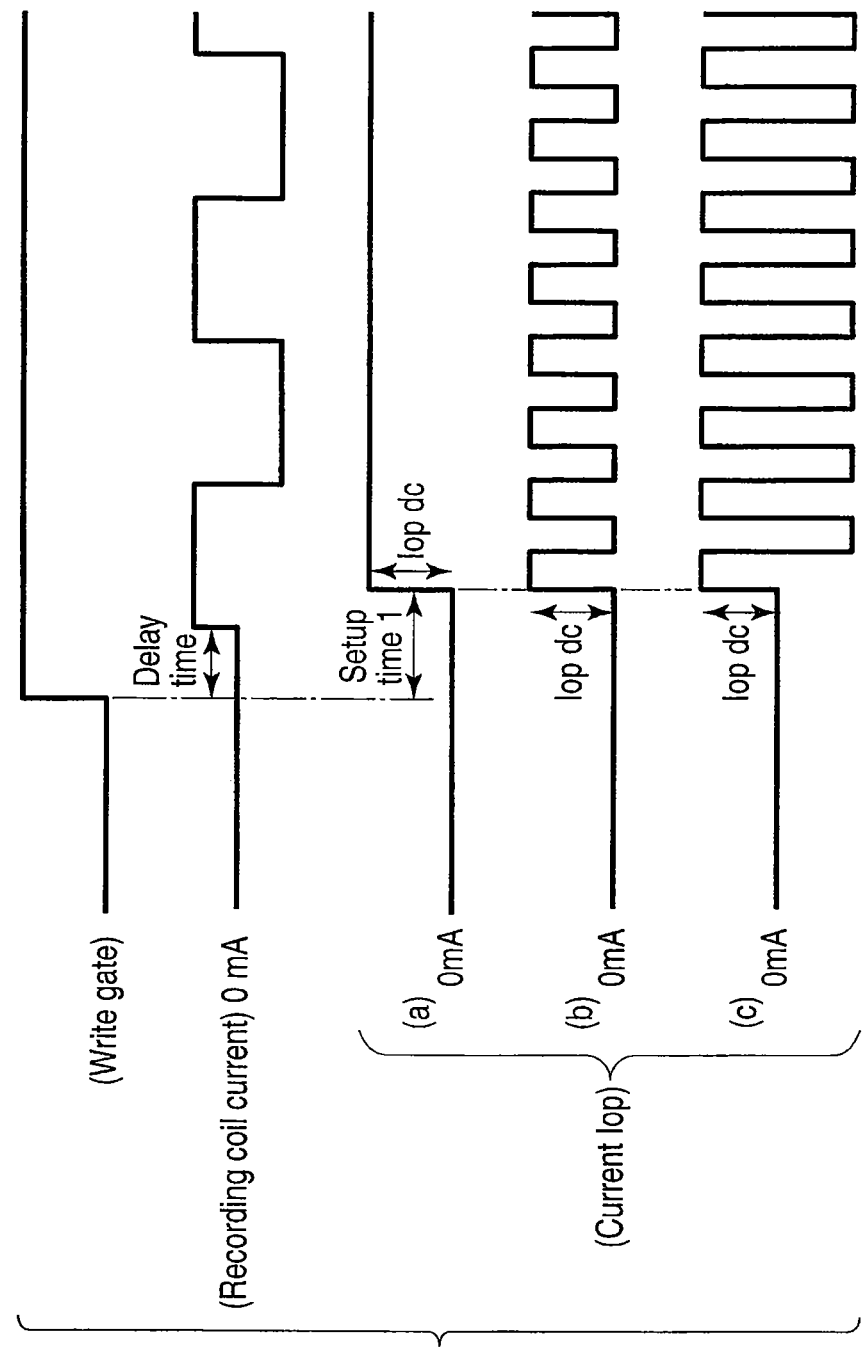
F I G. 11

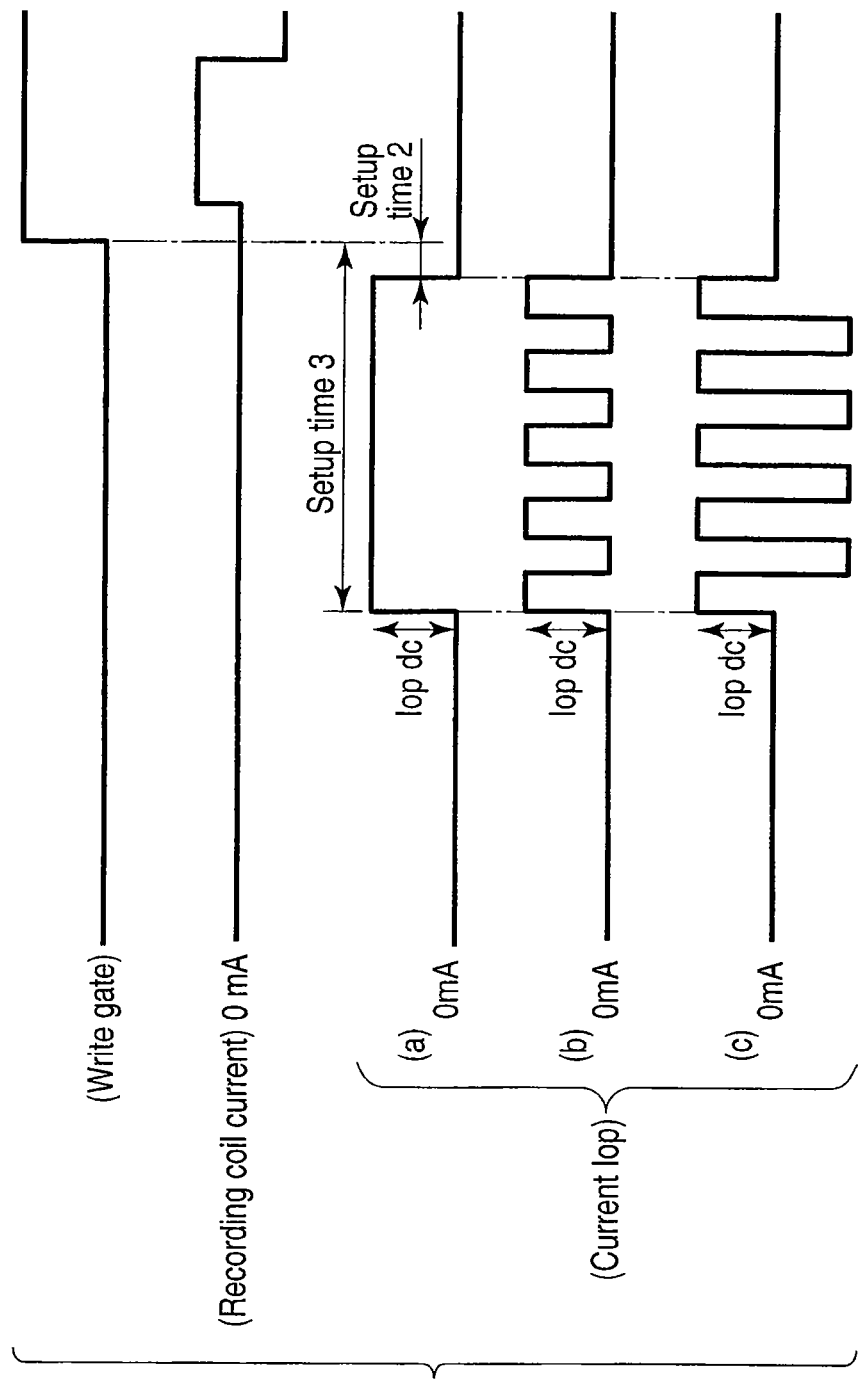
F I G. 12

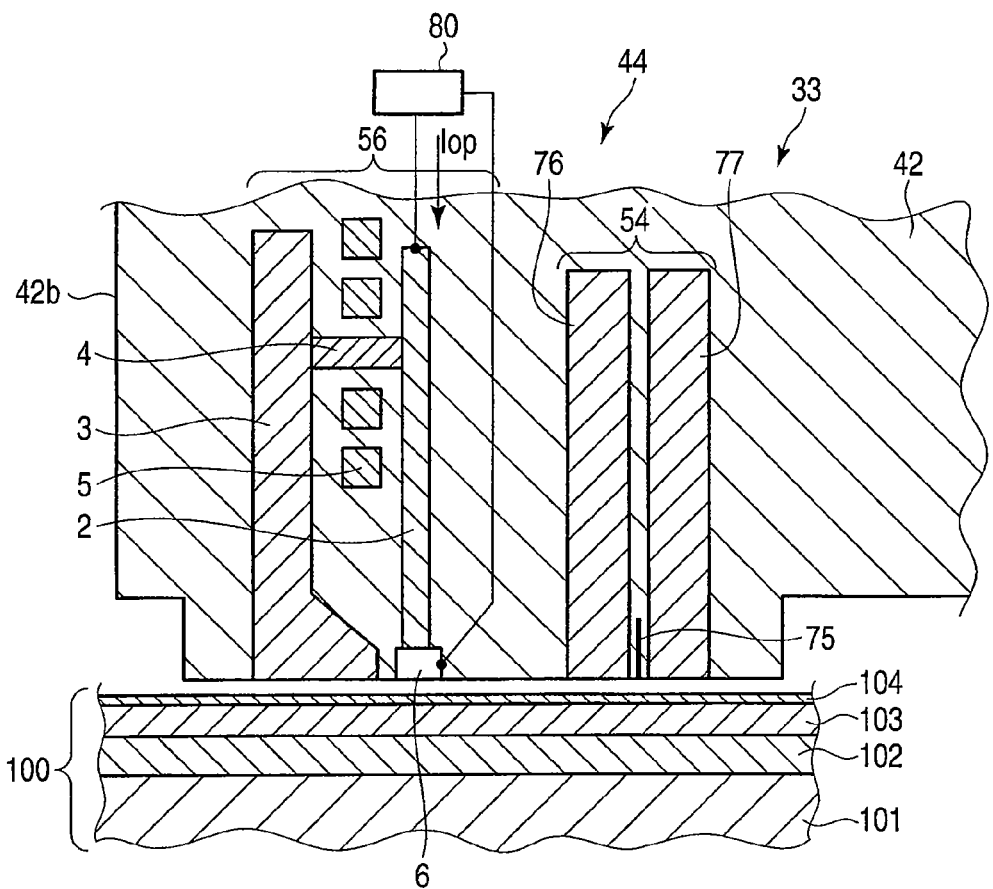
F I G. 24
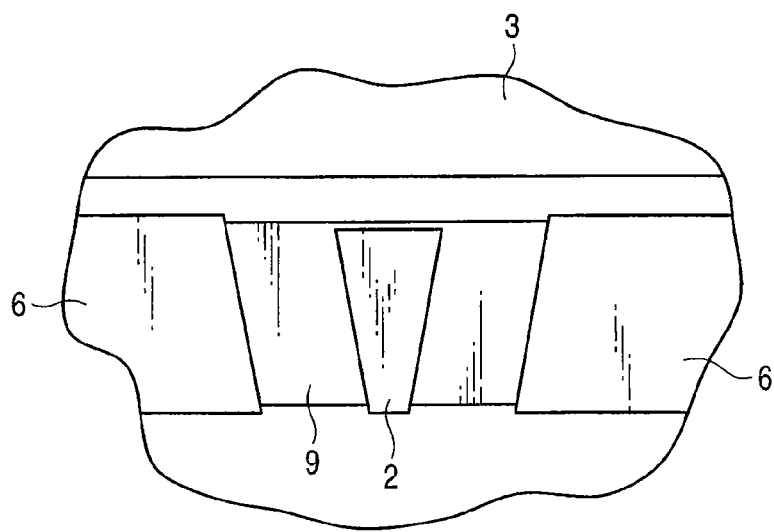
F I G. 25

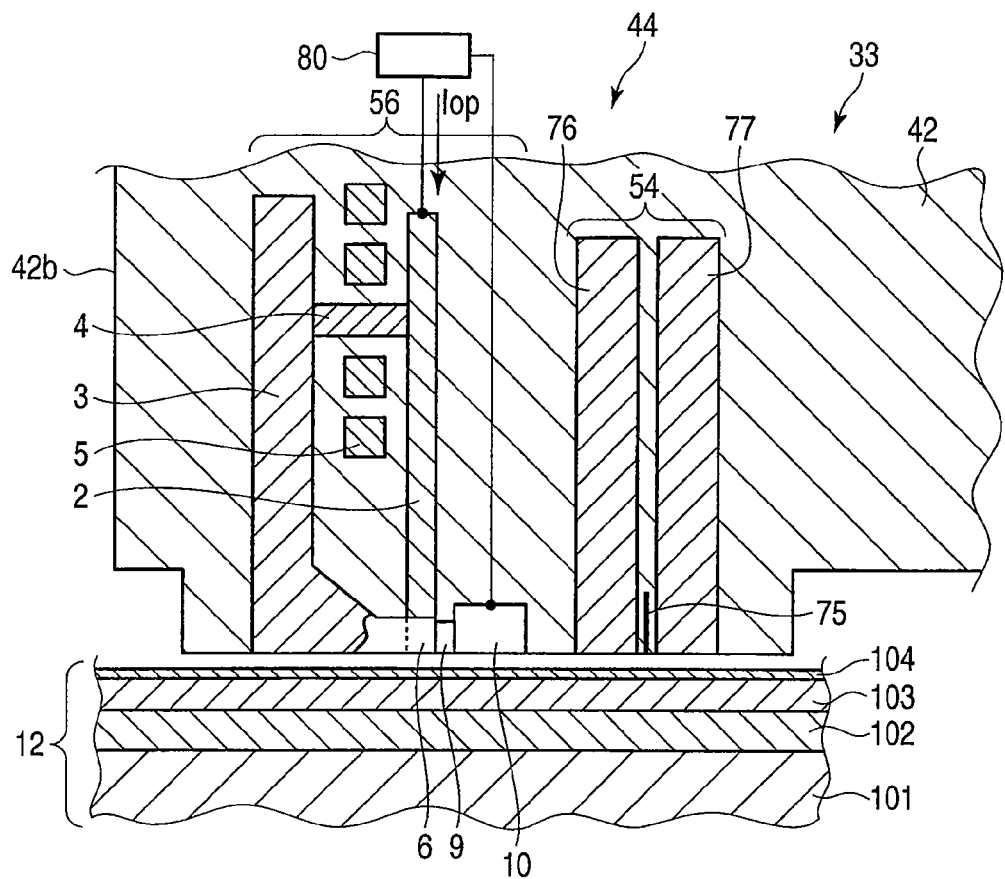
F I G. 30
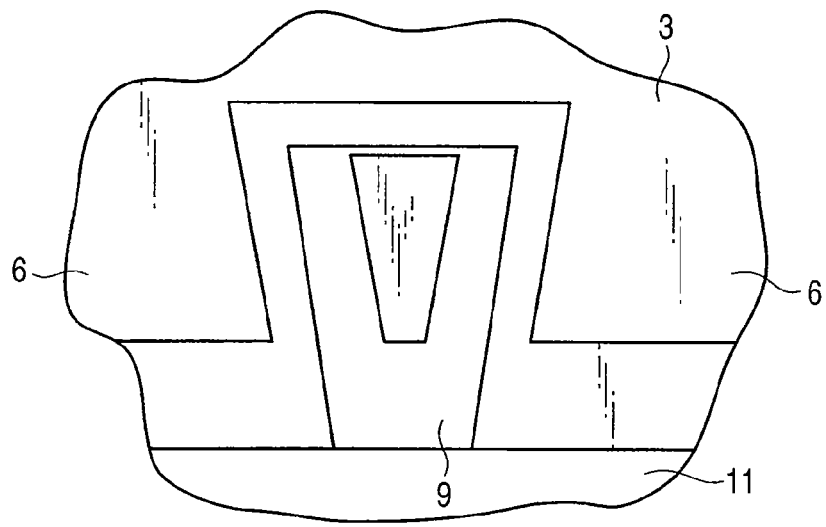
F I G. 31

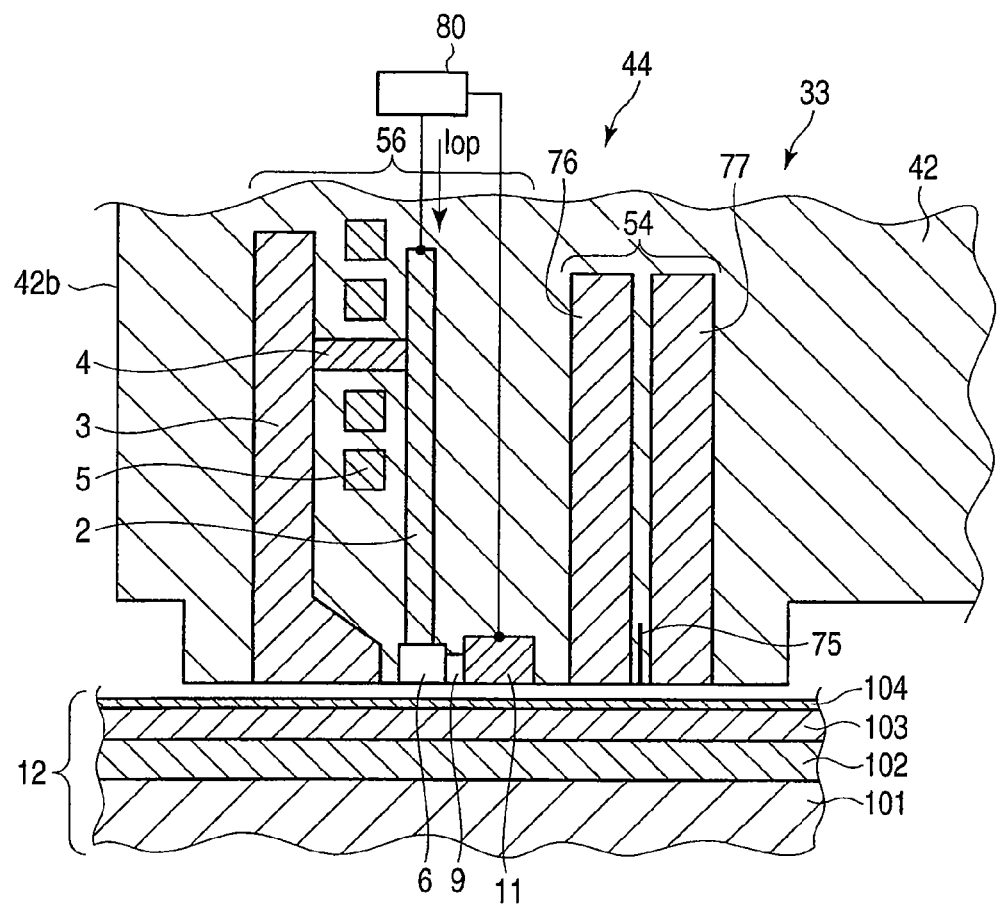
F I G. 36
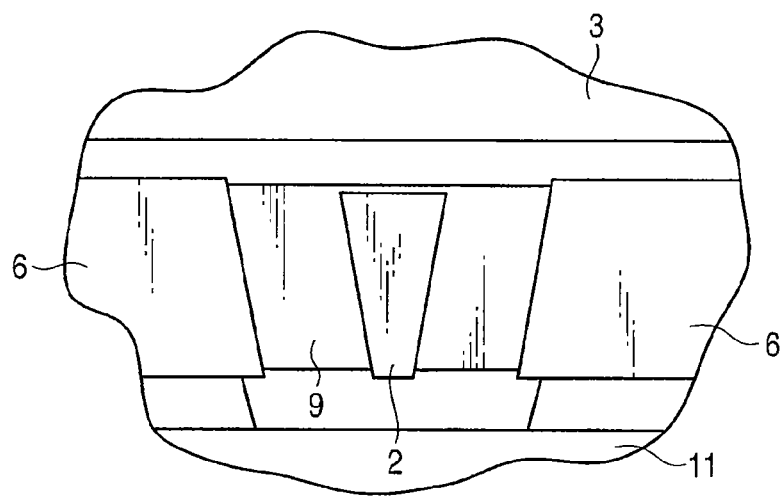
F I G. 37

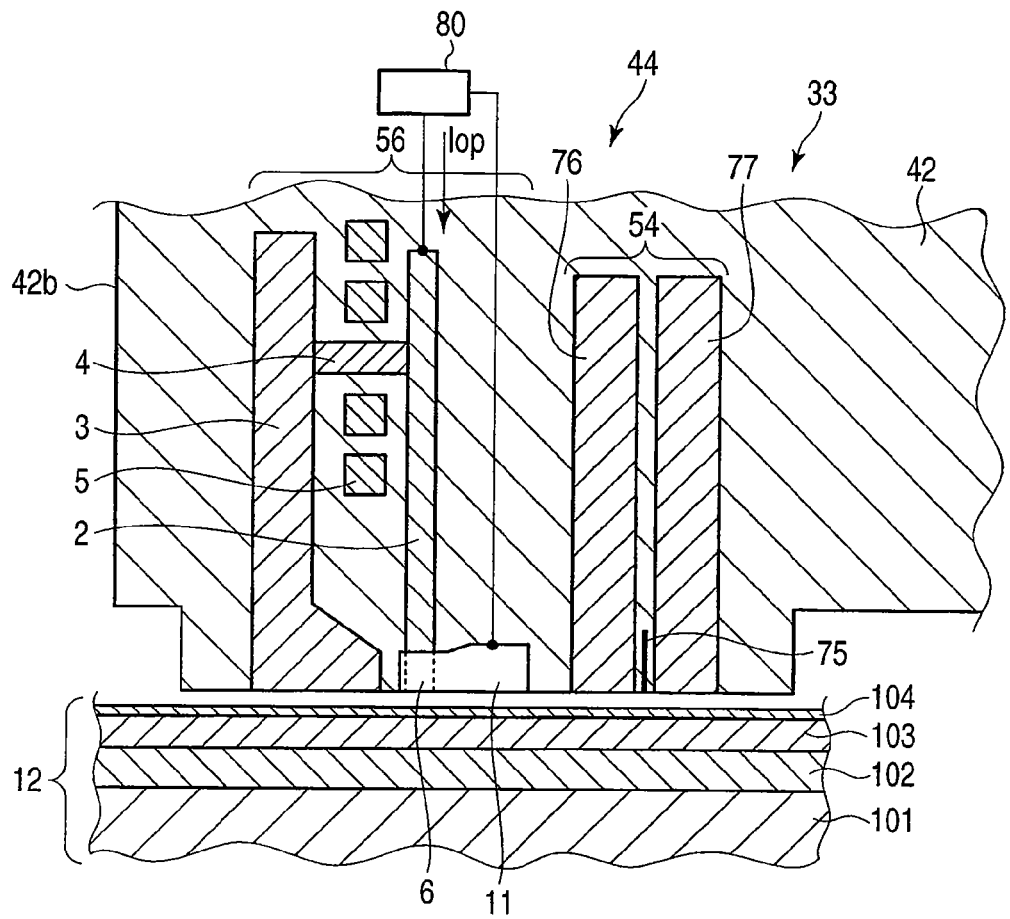
F I G. 4 0
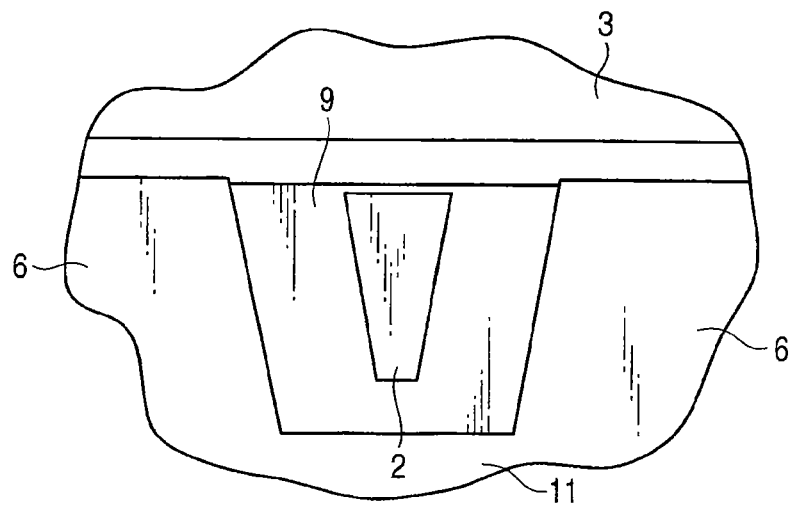
F I G. 4 1

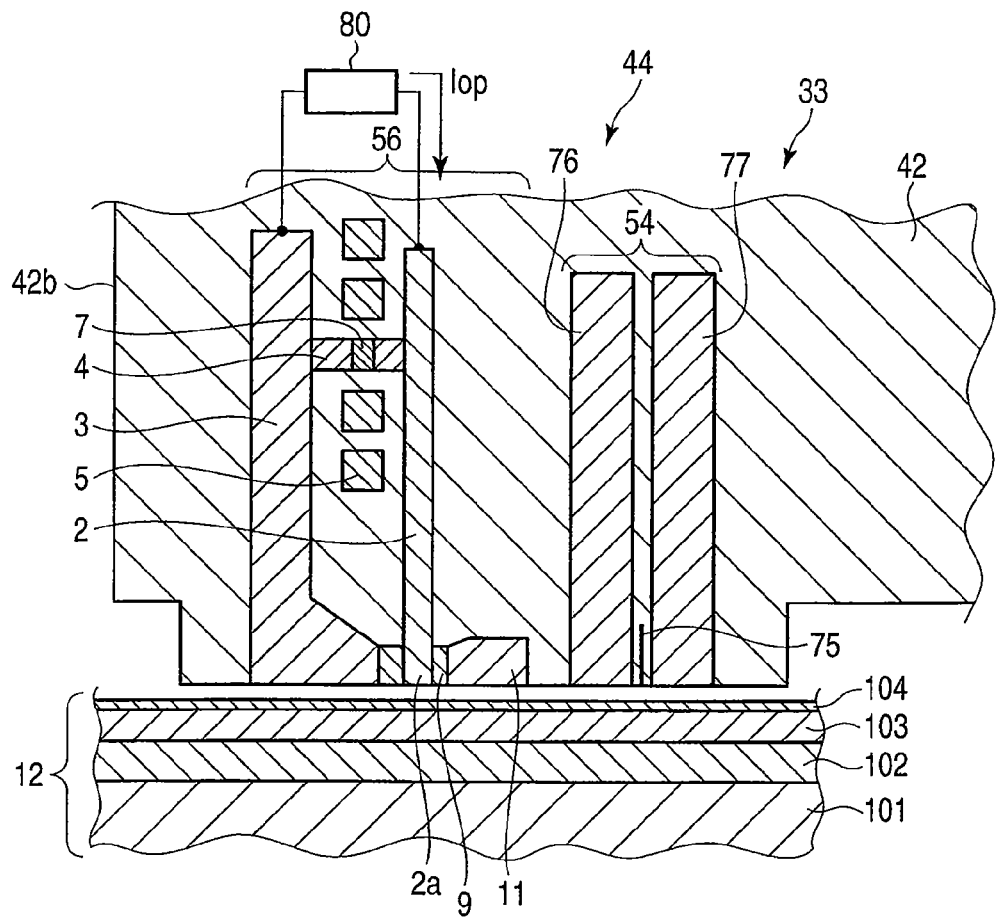
F I G. 42
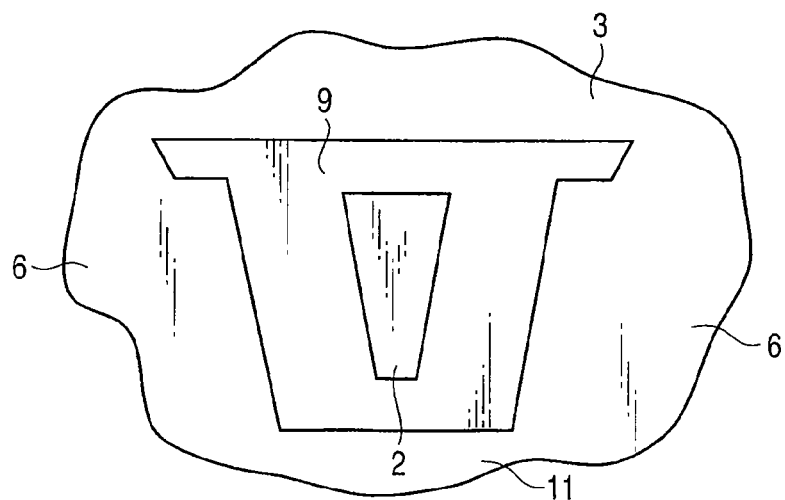
F I G. 43

CURRENT DRIVE TYPE MAGNETIC HEAD AND DISK DRIVE WITH THE SAME

CROSS-REFERENCE TO RELATED APPLICATIONS

This application is based upon and claims the benefit of priority from Japanese Patent Application No. 2010-232843, filed Oct. 15, 2010; the entire contents of which are incorporated herein by reference.

FIELD

Embodiments described herein relate generally to a magnetic head for perpendicular magnetic recording used in a disk drive and the disk drive provided with the same.

BACKGROUND

A disk drive, such as a magnetic disk drive, comprises a magnetic disk, spindle motor, magnetic head, and carriage assembly. The magnetic disk is disposed in a case. The spindle motor supports and rotates the disk. The magnetic head reads and writes data from and to the disk. The carriage assembly supports the head for movement relative to the disk. The carriage assembly comprises a pivotably supported arm and a suspension extending from the arm, and the magnetic head is supported on an extended end of the suspension. The head comprises a slider mounted on the suspension and a head section disposed on the slider. The head section comprises a recording head for writing and a reproduction head for reading.

Magnetic heads for perpendicular magnetic recording have recently been proposed in order to increase the recording density and capacity of a magnetic disk drive or reduce its size. In one such magnetic head, a recording head comprises a main pole configured to produce a perpendicular magnetic field, return or write/shield pole, and coil. The return pole is located on the trailing side of the main pole with a write gap therebetween and configured to close a magnetic path that leads to a magnetic disk. The coil serves to pass magnetic flux through the main pole.

To increase the recording density in the future, data must be recorded with a narrower track pitch. Therefore, the main pole of a recording head tends to become smaller and smaller. When the main pole is small, however, a pinning site of a magnetic domain wall is easily produced in it. Therefore, recording magnetic flux cannot be properly guided to the distal end of the main pole during signal recording, so that a magnetic field applied from the distal end of the main pole to a recording medium becomes unstable. Thus, the signal output becomes unstable, and the signal-to-noise ratio is degraded.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIGS. 8A and 8B are exemplary diagrams illustrating magnetization distributions within main poles of a magnetic head according to a comparative example and the magnetic head according to the first embodiment, respectively;

FIG. 9 is an exemplary diagram showing the relationship between the bit-error rate and recording coil current before and after Iop supply;

FIG. 11 is an exemplary diagram showing another example of patterns of currents supplied to the recording coil and main pole;

FIG. 12 is an exemplary diagram showing still another example of patterns of currents supplied to the recording coil and main pole;

FIG. 24 is an exemplary sectional view showing a magnetic head of an HDD according to a fourth embodiment;

FIG. 25 is an exemplary plan view of a recording head of the fourth embodiment taken from the ABS side;

FIG. 30 is an exemplary sectional view showing a magnetic head of an HDD according to an eighth embodiment;

FIG. 31 is an exemplary plan view of a recording head of the eighth embodiment taken from the ABS side;

FIG. 36 is an exemplary sectional view showing a magnetic head of an HDD according to an eleventh embodiment;

FIG. 37 is an exemplary plan view of a recording head of the eleventh embodiment taken from the ABS side;

FIG. 40 is an exemplary sectional view showing a magnetic head of an HDD according to a thirteenth embodiment;

FIG. 41 is an exemplary plan view of a recording head of the thirteenth embodiment taken from the ABS side;

FIG. 42 is an exemplary sectional view showing a magnetic head of an HDD according to a fourteenth embodiment; and FIG. 43 is an exemplary plan view of a recording head of the fourteenth embodiment taken from the ABS side.

DETAILED DESCRIPTION

Various embodiments will be described hereinafter with reference to the accompanying drawings.

In general, according to one embodiment, a magnetic head comprises a magnetic core comprising a main pole configured to apply a recording magnetic field perpendicular to a recording layer of a recording medium, and a return pole opposed to the main pole with a magnetic gap therebetween, and configured to return magnetic flux from the main pole and form a magnetic circuit in conjunction with the main pole; a coil configured to excite magnetic flux in the magnetic circuit formed of the main pole and the return pole; and a nonmagnetic electrically conductive layer formed by disposing only a nonmagnetic material in the magnetic gap between the return pole and an end portion of the main pole on the recording medium side, and configured to electrically connect the main pole and the return pole. The main pole, the nonmagnetic electrically conductive layer, and the return pole are configured to constitute a series electrical circuit.

Hard disk drives (HDDs) as disk drives according to various embodiments will now be described in detail.

(First Embodiment)

Figure 1:
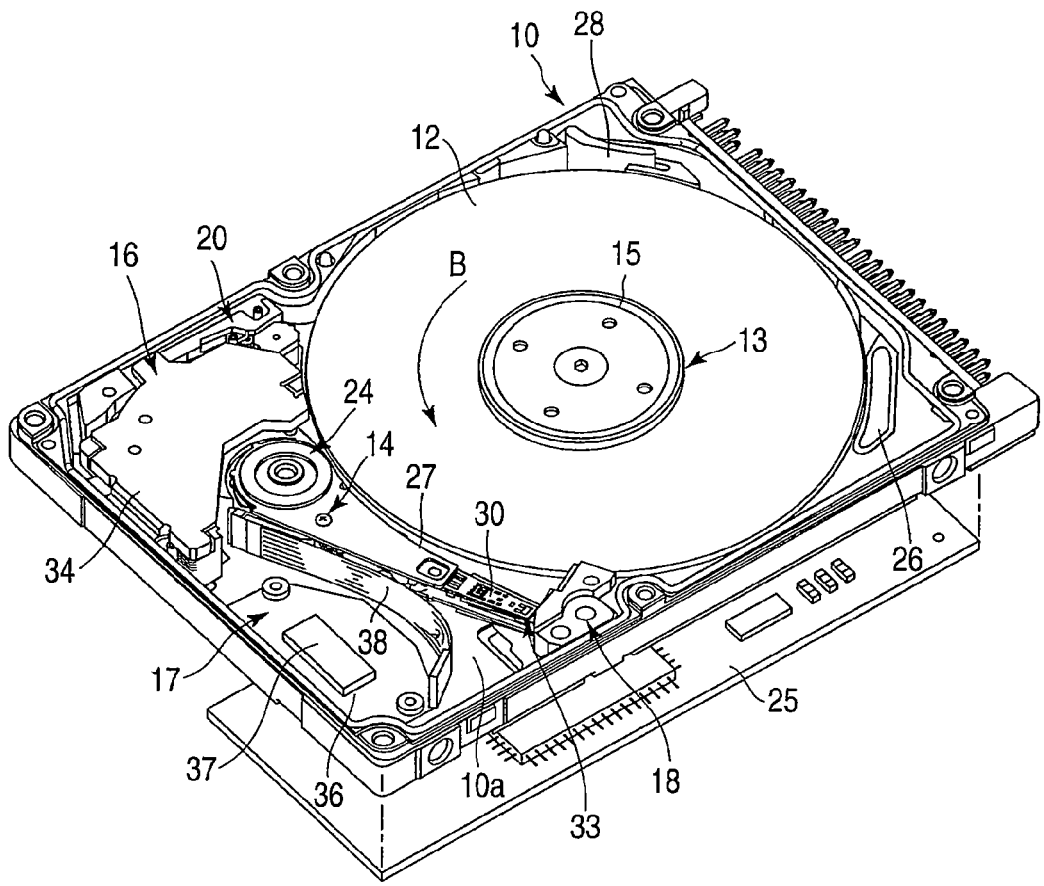
FIG. 1 is an exemplary perspective view showing a magnetic disk drive (HDD) according to a first embodiment.
Figure 2:
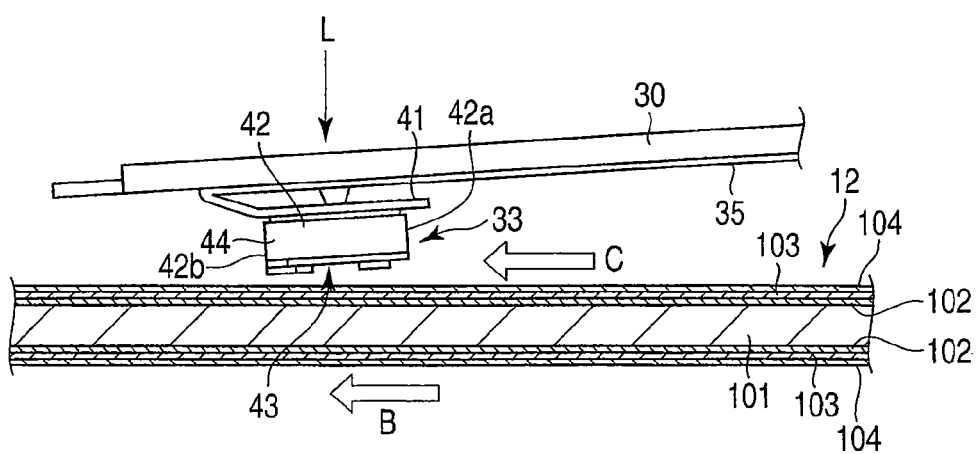
FIG. 2 is an exemplary side view showing a magnetic head and suspension of the HDD.

FIG. 1 shows the internal structure of an HDD according to a first embodiment with its top cover removed, and FIG. 2 shows a flying magnetic head. As shown in FIG. 1, the HDD comprises a housing 10. The housing 10 comprises a base 10a in the form of an open-topped rectangular box and a top cover (not shown) in the form of a rectangular plate. The top cover is attached to the base by screws such that it closes the top opening of the base. Thus, the housing 10 is kept airtight inside and can communicate with the outside through a breather filter 26 only.

The base 10a carries thereon a magnetic disk 12, for use as a recording medium, and a mechanical unit. The mechanical unit comprises a spindle motor 13, a plurality (e.g., two) of magnetic heads 33, head actuator 14, and voice coil motor (VCM) 16. The spindle motor 13 supports and rotates the magnetic disk 12. The magnetic heads 33 record and reproduce data on and from the disk 12. The head actuator 14 supports the heads 33 for movement relative to the surfaces of the disk 12. The VCM 16 pivots and positions the head actuator. The base 10a further carries a ramp loading mechanism 18, latch mechanism 20, and board unit 17. The ramp loading mechanism 18 holds the magnetic heads 33 in a position off the magnetic disk 12 when the heads are moved to the outermost periphery of the disk. The latch mechanism 20 holds the head actuator 14 in a retracted position if the HDD is jolted, for example. Electronic components, such as a preamplifier, head IC, etc., are mounted on the board unit 17.

A control circuit board 25 is attached to the outer surface of the base 10a by screws such that it faces a bottom wall of the base. The circuit board 25 controls the operations of the spindle motor 13, VCM 16, and magnetic heads 33 through the board unit 17.

As shown in FIG. 1, the magnetic disk 12 is coaxially fitted on the hub of the spindle motor 13 and clamped and secured to the hub by a clamp spring 15, which is attached to the upper end of the hub by screws. The disk 12 is rotated at a predetermined speed in the direction of arrow B by the spindle motor 13 for use as a drive motor.

The head actuator 14 comprises a bearing 24 secured to the bottom wall of the base 10a and a plurality of arms 27 extending from the bearing. The arms 27 are arranged parallel to the surfaces of the magnetic disk 12 and at predetermined intervals and extend in the same direction from the bearing 24. The head actuator 14 comprises elastically deformable suspensions 30 each in the form of an elongated plate. Each suspension 30 is formed of a plate spring, the proximal end of which is secured to the distal end of its corresponding arm 27 by spot welding or adhesive bonding and which extends from the arm. Each suspension 30 may be formed integrally with its corresponding arm 27. The magnetic heads 33 are supported individually on the respective extended ends of the suspensions 30. Each arm 27 and its corresponding suspension 30 constitute a head suspension, and the head suspension and each magnetic head 33 constitute a head suspension assembly.

As shown in FIG. 2, each magnetic head 33 comprises a substantially cuboid slider 42 and read/write head section 44 on an outflow end (trailing end) of the slider. Each head 33 is secured to a gimbal spring 41 on the distal end portion of each corresponding suspension 30. A head load L directed to the surface of the magnetic disk 12 is applied to each head 33 by the elasticity of the suspension 30. The two arms 27 are arranged parallel to and spaced apart from each other, and the suspensions 30 and heads 33 mounted on these arms face one another with the magnetic disk 12 between them.

Each magnetic head 33 is electrically connected to a main FPC 38 (described later) through a relay flexible printed circuit (FPC) board 35 secured to the suspension 30 and arm 27.

As shown in FIG. 1, the board unit 17 comprises an FPC main body 36 formed of a flexible printed circuit board and the main FPC 38 extending from the FPC main body. The FPC main body 36 is secured to the bottom surface of the base 10a. The electronic components, including a preamplifier 37 and head IC, are mounted on the FPC main body 36. An extended end of the main FPC 38 is connected to the head actuator 14 and also connected to each magnetic head 33 through each relay FPC 35.

The VCM 16 comprises a support frame (not shown) extending from the bearing 24 in the direction opposite to the arms 27 and a voice coil supported on the support frame. When the head actuator 14 is assembled to the base 10a, the voice coil is located between a pair of yokes 34 that are secured to the base 10a. Thus, the voice coil, along with the yokes and a magnet secured to the yokes, constitutes the VCM 16.

If the voice coil of the VCM 16 is energized with the magnetic disk 12 rotating, the head actuator 14 pivots, whereupon each magnetic head 33 is moved to and positioned on a desired track of the disk 12. As this is done, the head 33 is moved radially relative to the disk 12 between the inner and outer peripheral edges of the disk.

Figure 3:
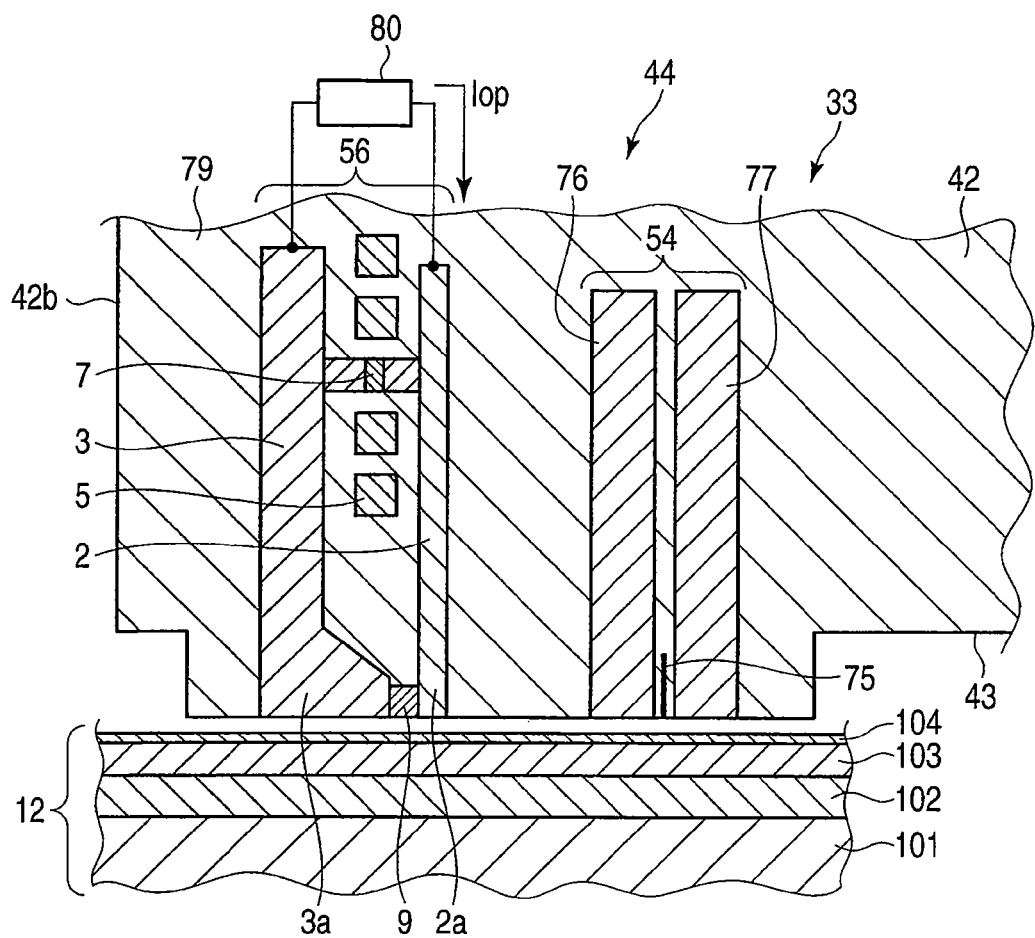
FIG. 3 is an exemplary enlarged sectional view showing a head section of the magnetic head and a magnetic disk.

The following is a detailed description of configurations of the magnetic disk 12 and each magnetic head 33. FIG. 3 is an enlarged sectional view showing the magnetic disk and the head section 44 of the head 33.

As shown in FIGS. 1 to 3, the magnetic disk 12 comprises a substrate 101 formed of a nonmagnetic disk with a diameter of, for example, about 2.5 inches. A soft magnetic layer 102 for use as an underlayer of a material having soft magnetic properties is formed on each surface of the substrate 101. The soft magnetic layer 102 is overlain by a magnetic recording layer 103, which has a magnetic anisotropy perpendicular to the disk surface. A protective film layer 104 is formed on the recording layer 103.

As shown in FIGS. 2 and 3, the magnetic head 33 is formed as a flying head, and comprises the substantially cuboid slider 42 and the head section 44 formed on the outflow or trailing end of the slider. The slider 42 is formed of, for example, a sintered body (AlTic) containing alumina and titanium carbide, and the head section 44 is a thin film.

The slider 42 has a rectangular disk-facing surface or air-bearing surface (ABS) 43 configured to face a surface of the magnetic disk 12. The slider 42 is caused to fly by airflow C that is produced between the disk surface and the ABS 43 as the disk 12 rotates. The direction of airflow C is coincident with the direction of rotation B of the disk 12. The slider 42 is disposed on the surface of the disk 12 in such a manner that the longitudinal direction of the ABS 43 is substantially coincident with the direction of airflow C.

The slider 42 comprises leading and trailing ends 42a and 42b on the inflow and outflow sides, respectively, of airflow C. The ABS 43 of the slider 42 is formed with leading and trailing steps, side steps, negative-pressure cavity, etc., which are not shown.

As shown in FIG. 3, the head section 44 is formed as a dual-element magnetic head, comprising a reproduction head 54 and recording head 56 formed on the trailing end 42b of the slider 42 by thin-film processing.

The reproduction head 54 comprises a magnetic film 75 having a magnetoresistive effect and shield films 76 and 77 disposed on the trailing and leading sides, respectively, of the magnetic film such that they sandwich the magnetic film between them. The respective lower ends of the magnetic film 75 and shield films 76 and 77 are exposed in the ABS 43 of the slider 42.

The recording head 56 is located nearer to the trailing end 42b of the slider 42 than the reproduction head 54. The recording head 56 is constructed as a single magnetic pole comprising a return pole on the trailing end side.

Figure 4:
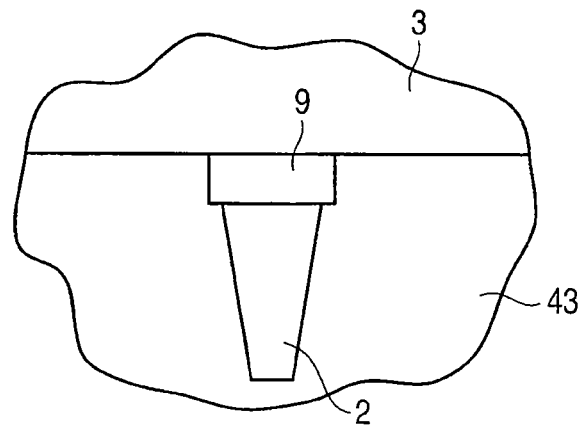
FIG. 4 is an exemplary plan view of the head section taken from the ABS side of a slider.
Figure 5:
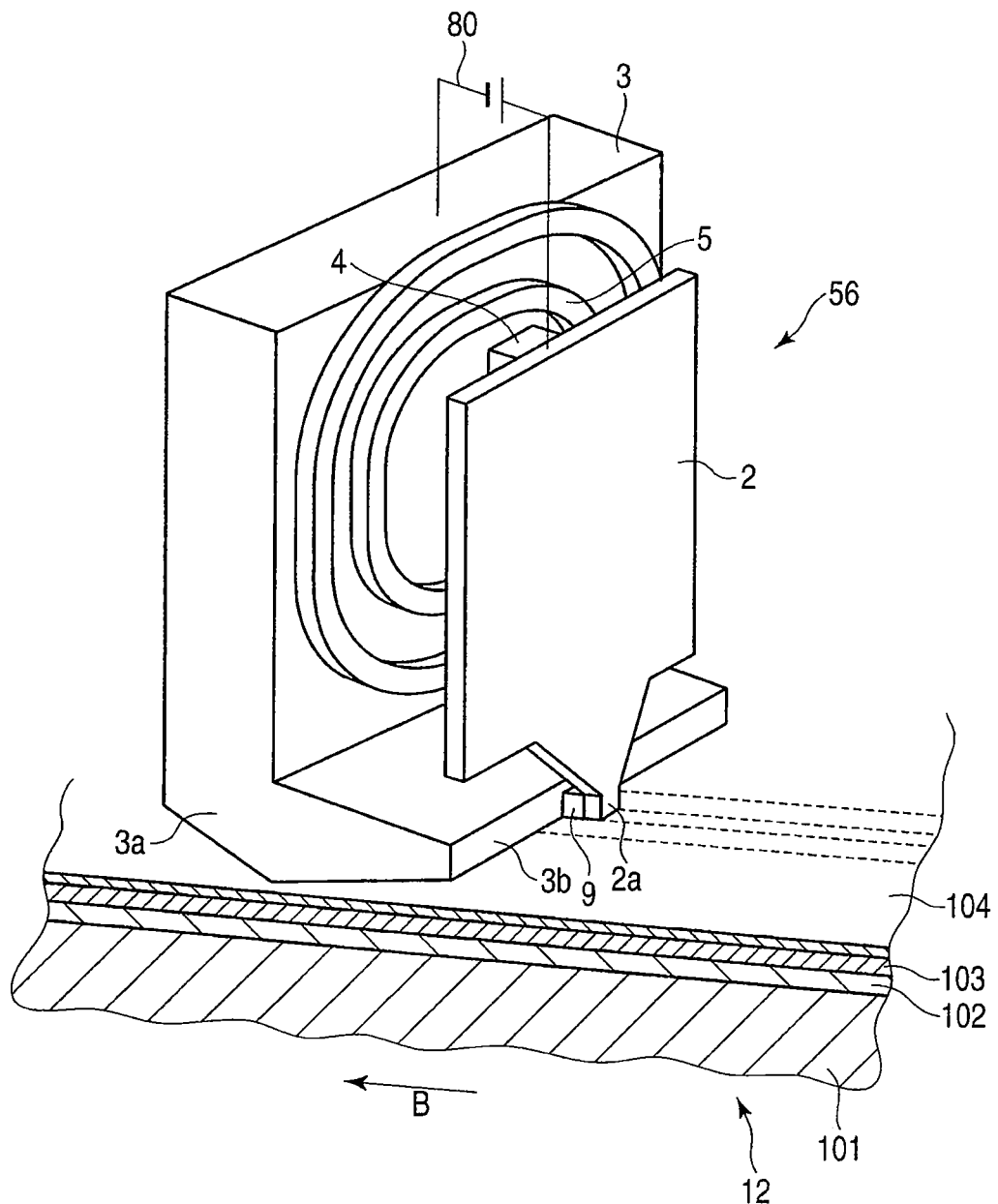
FIG. 5 is an exemplary perspective view schematically showing a recording head of the magnetic head.

FIG. 4 is a plan view of the recording head 56 taken from the ABS side of a slider 42, and FIG. 5 is a perspective view schematically showing the recording head 56. As shown in FIGS. 3 to 5, the recording head 56 comprises a magnetic core and recording coil 5. The magnetic core comprises a main pole 2, return pole 3, and junction 4. The main pole 2 has soft magnetic properties and produces a recording magnetic field perpendicular to the surfaces of the magnetic disk 12. The return pole 3 is disposed on the trailing side of the main pole 2 and serves to close a magnetic path with the aid of the soft magnetic layer 102 just below the main pole. The junction 4 connects the respective upper end portions of the main and return poles. The recording coil 5 is disposed such that it is wound around the magnetic path including the main and return poles 2 and 3 to pass magnetic flux to the main pole 2 while a signal is being written to the magnetic disk 12. The junction 4 is formed with an insulating layer 7 for electrically insulating the main and return poles 2 and 3 from each other.

The main pole 2 extends substantially at right angles to the surfaces of the magnetic disk 12. A distal end portion 2a of the main pole 2 on the disk side is tapered toward the disk surface. The distal end portion 2a of the main pole 2 has, for example, a trapezoidal cross-section. The distal end surface of the main pole 2 is exposed in the ABS 43 of the slider 42.

The return pole 3 is substantially L-shaped and its distal end portion 3a has an elongated rectangular shape. The distal end surface of the return pole 3 is exposed in the ABS 43 of the slider 42. A leading end surface 3b of the distal end portion 3a extends transversely relative to the track of the magnetic disk 12. The leading end surface 3b is opposed parallel to the trailing end surface of the main pole 2 with a write gap therebetween.

The recording head 56 comprises a nonmagnetic electrically conductive layer 9, which is located between facing surfaces of the respective distal end portions 2a and 3a of the main and return poles 2 and 3, in the vicinity of the slider 43, and is formed by filming only a nonmagnetic material in order to be able to electrically connect the main and return poles. Only the conductive layer 9 is interposed between the distal end portions 2a and 3a of the poles 2 and 3. The conductive layer 9 may be either a single-layer structure or a multi-layer structure formed by laminating a plurality of nonmagnetic electrically conductive layers. The material of the conductive layer 9 may be copper, silver, gold, aluminum, or Nichrome. The conductive layer 9 may be recessed from the ABS 43 on the side opposite to the magnetic disk 12, or a protective layer, such as a DLC film, may be provided on the side of that surface of the conductive layer 9 which faces the magnetic disk 12.

A current source 80 is connected to the main and return poles 2 and 3, whereby a current circuit is constructed so that current Iop from the current source can be supplied in series through the nonmagnetic electrically conductive layer 9 and return pole 3.

As shown in FIG. 3, a protective insulating film entirely covers the reproduction head 54 and recording head 56 except for those parts which are exposed in the ABS 43 of the slider 42. The protective insulating film defines the contour of the head section 44.

Figure 6:
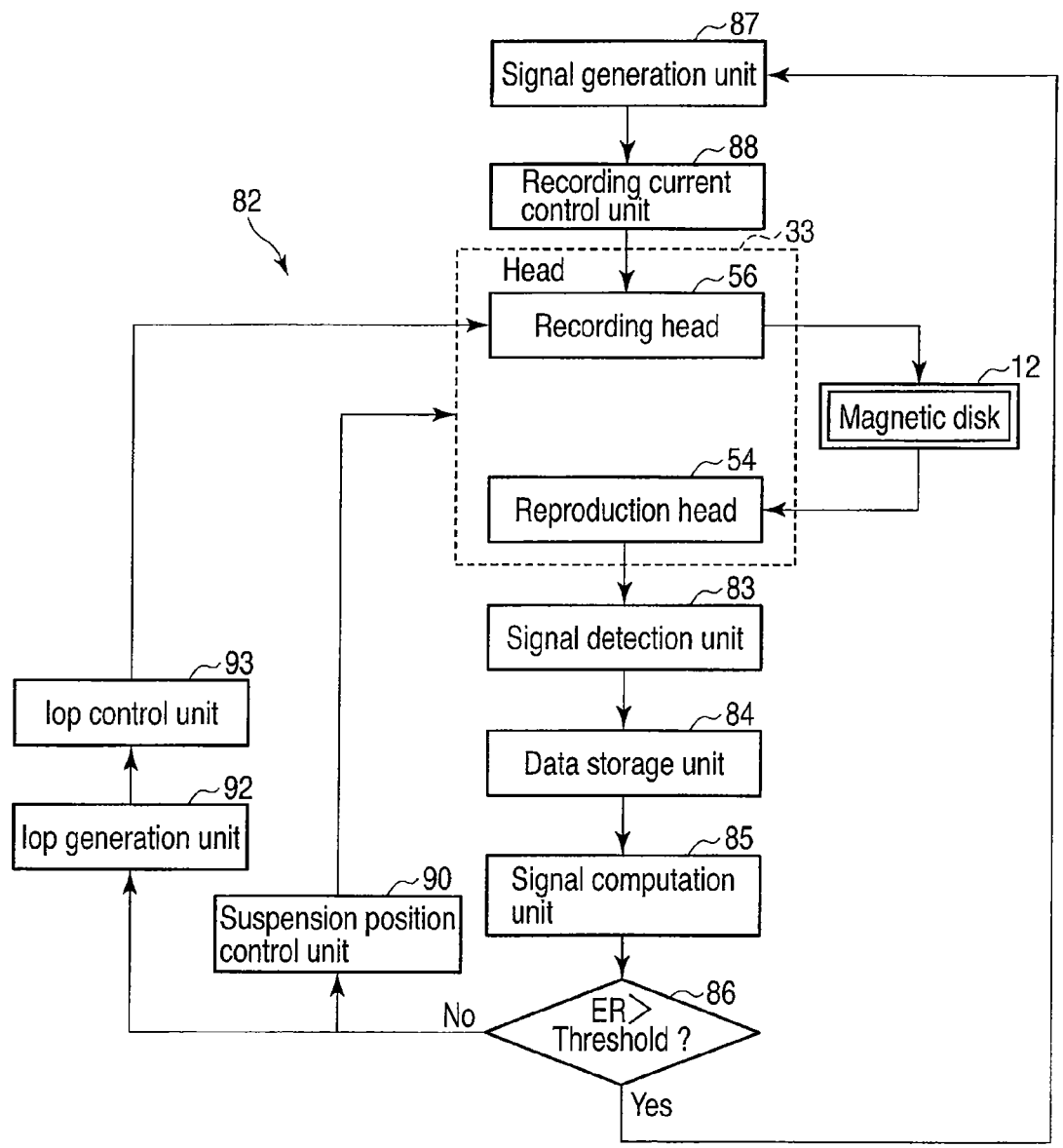
FIG. 6 is an exemplary block diagram showing a control unit of the magnetic disk.

FIG. 6 schematically shows a control unit 82 for controlling the operation of the HDD and current supply to the recording head 56. The control unit 82 attached to the control circuit board 25 comprises a signal detection unit 83, data storage unit 84, signal computation unit 85, comparison unit 86, signal generation unit 87, and recording current control unit 88. The signal detection unit 83 detects a signal read from the magnetic disk 12 by the reproduction head 54. The data storage unit 84 stores the detected signal. The signal computation unit 85 computes the signal. The comparison unit 86 compares the threshold of the computed signal with a bit-error rate (ER). The signal generation unit 87 generates a signal to be written to the magnetic disk 12 if the threshold of the signal is lower than the ER. The recording current control unit 88 controls a recording current to be supplied to the recording coil 5 of the recording head 56 in response to the written signal. Further, the control unit 82 comprises a suspension position control unit 90, current (Iop) generation unit 92, and current (Iop) control unit 93. The suspension position control unit 90 adjusts the positions of the head actuator 14 and suspension if the threshold of the read signal is higher than the ER. The current (Iop) generation unit 92 generates current Iop to be supplied from the current source 80 to the recording head 56. The current (Iop) control unit 93 controls the supplied current.

Figure 7:
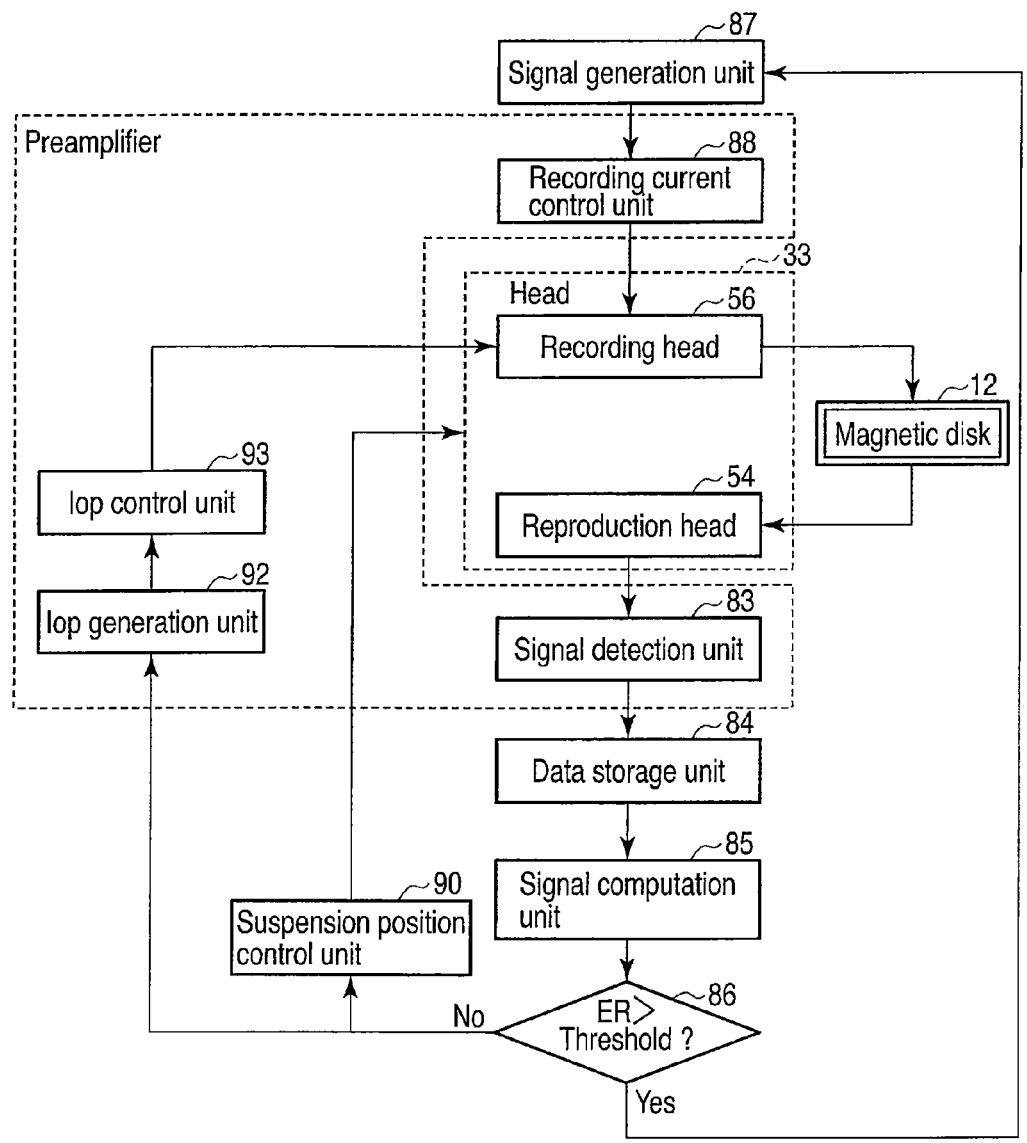
FIG. 7 is an exemplary block diagram showing a modification of the control unit.

As shown in FIG. 7, the signal detection unit 83, recording current control unit 88, current generation unit 92, and current control unit 93 may be arranged at the preamplifier portion of the board unit 17 in the housing 10.

When the VCM 16 is activated, according to the HDD constructed in this manner, the head actuator 14 pivots, whereupon each magnetic head 33 is moved to and positioned on a desired track of the magnetic disk 12. Further, the magnetic head 33 is caused to fly by airflow C that is produced between the disk surface and the ABS 43 as the magnetic disk 12 rotates. When the HDD is operating, the ABS 43 of the slider 42 is opposed to the disk surface with a gap therebetween. As shown in FIG. 2, the magnetic head 33 is caused to fly in an inclined posture such that the recording head 56 of the head section 44 is located closest to the surface of the disk 12. In this state, the reproduction head 54 reads recorded data from the disk 12, while the recording head 56 writes data (signal) to the disk.

In writing data, an alternating current is passed through the recording coil 5 of the recording head 56, whereupon data is written to the magnetic recording layer 103 of the magnetic disk 12 by means of a magnetic field from the distal end surface of the main pole 2 on the ABS side. When or before the recording coil 5 is energized, moreover, current Iop from the current source 80 is passed through an electrical circuit in which the main pole 2, nonmagnetic electrically conductive layer 9, and return pole 3 are connected in series.

FIGS. 8A and 8B schematically illustrate comparison of the magnetization state of the main pole 2 during signal recording between a comparative example comprising a recording head the main pole of which is not energized and the recording head according to the present embodiment. FIG. 8A shows the comparative example, and FIG. 8B shows the main pole of the recording head of the present embodiment. FIG. 9 illustrates the dependence of the bit-error rate on the recording coil current before and after the supply of current Iop.

If the track width of the distal end portion 2a of the main pole 2 is reduced, a pinning site is produced in which the magnetic domain wall of the main pole is pinned so that the magnetization response is degraded as the signal is written, as in the comparative example shown in FIG. 8A. As the signal is recorded, therefore, recording magnetic flux fails to be properly guided to the distal end portion of the main pole 2, so that a magnetic field applied from the distal end portion of the main pole to the magnetic disk 12 is degraded.

In the present embodiment, in contrast, current Iop is introduced into the main pole 2 so that transmission-type spin torque is induced in response to magnetization in the main pole. Thereupon, the magnetic domain wall in the main pole 2 is actuated so that magnetization pinning within the pinning site can be canceled and the magnetization responds in the same direction as the direction of main pole magnetization, as shown in FIG. 8B. In this way, a head field can be stably generated from the distal end of the main pole 2 and applied to the magnetic disk 12. Thus, the bit-error rate after the Iop supply can be considerably improved compared with that before the Iop supply, as shown in FIG. 9.

Figure 10:
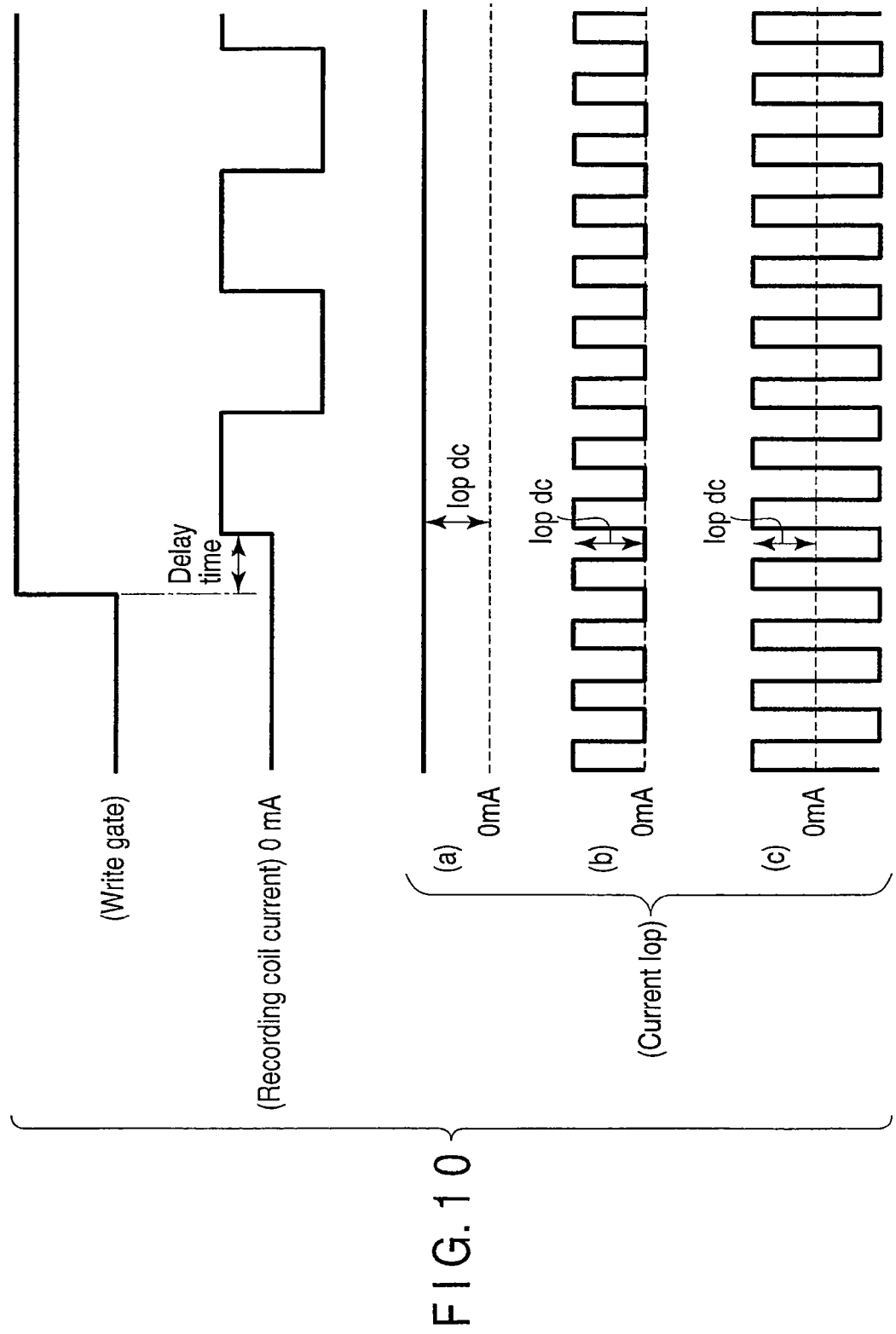
FIG. 10 is an exemplary diagram showing an example of patterns of currents supplied to a recording coil and main pole.

FIG. 10 shows an example of patterns of currents supplied to the recording coil 5 and main pole 2 of each magnetic head 33. After the write gate is turned on, under the control of the control unit 82 with the HDD operating, an alternating current is supplied to the recording coil 5 with a predetermined delay time. When the HDD is operating, moreover, current Iop from the current source 80 is always supplied in the form of direct current (a) or pulses (b) and (c) to the electrical circuit including the main and return poles 2 and 3 without regard to the operation, write or read, of the magnetic head 33.

The current drive of the magnetic domain wall in the main pole 2 is accelerated by current supply at an appropriate pulse frequency near the natural frequency of the magnetic domain wall. Iop·dc and the frequency of pulse energization are adjusted so that the bit-error rate is optimal or within a specified range. The supply direction of current Iop may be opposite to the direction shown in FIG. 3.

FIG. 11 shows another example of patterns of currents supplied to the recording coil 5 and main pole 2 of each magnetic head 33. In writing a signal, in this case, current Iop from the current source 80 is supplied in the form of direct current (a) or pulses (b) and (c) to the electrical circuit including the main and return poles 2 and 3 in a given setup time 1 after the activation of the write gate, under the control of the control unit 82. Iop·dc and the frequency of pulse energization are adjusted so that the bit-error rate is optimal or within the specified range.

FIG. 12 shows another example of patterns of currents supplied to the recording coil 5 and main pole 2 of each magnetic head 33. During a read operation before the writing by the magnetic head 33, in this case, current Iop from the current source 80 is supplied in the form of direct current (a) or pulses (b) and (c) to the electrical circuit including the main and return poles 2 and 3, for example, a given setup time 3 before the activation of the write gate, under the control of the control unit 82. The current supply is stopped a given setup time 2 before the activation of the write gate.

Iop·dc, setup times 2 and 3, and the frequency of pulse energization are adjusted so that the bit-error rate is optimal or within the specified range.

Figure 13:
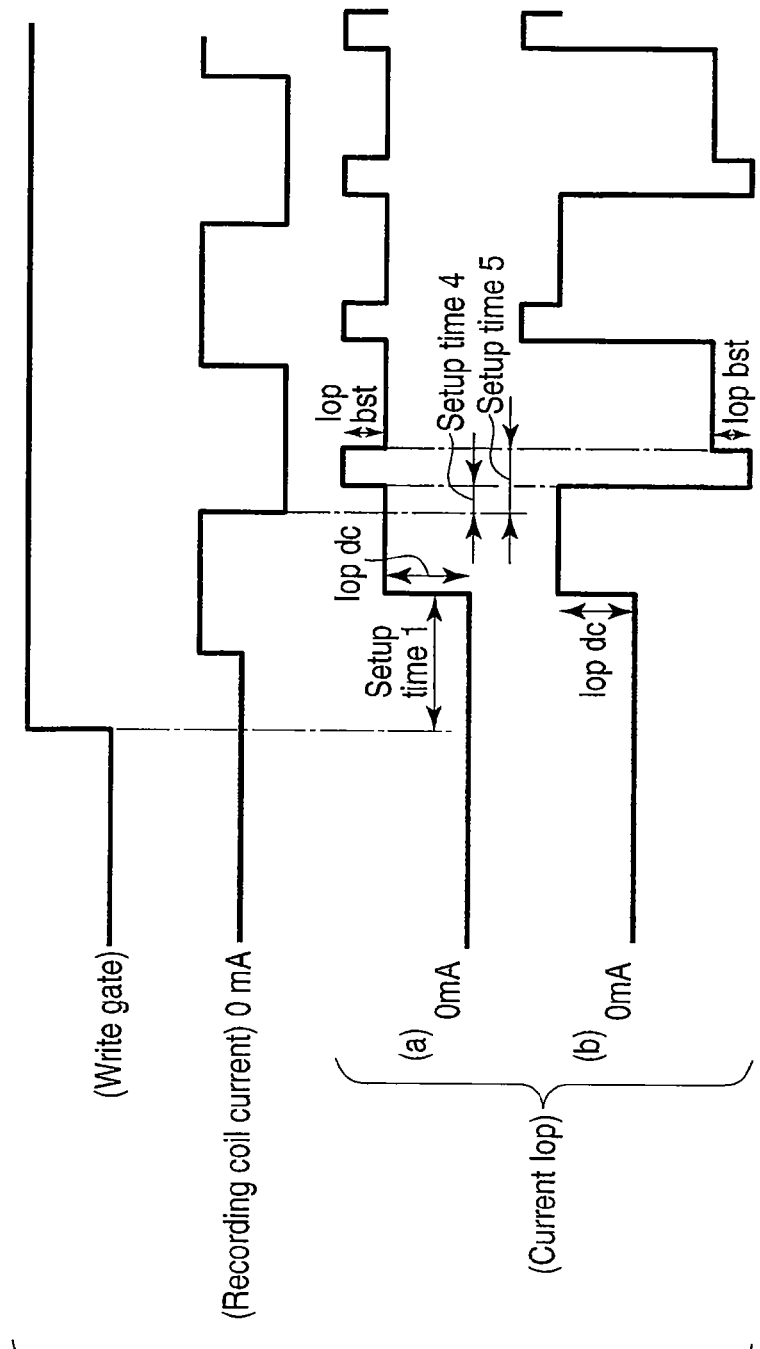
FIG. 13 is an exemplary diagram showing a further example of patterns of currents supplied to the recording coil and main pole.

FIG. 13 shows another example of patterns of currents supplied to the recording coil 5 and main pole 2 of each magnetic head 33. During the write operation by the magnetic head 33, in this case, current Iop from the current source 80 is supplied in the form of pulses (a) and (b) to the electrical circuit including the main and return poles 2 and 3, in synchronism with the current supply to the recording coil 5.

Iop·dc, Iop·bst, setup times 1, 4 and 5, and the frequency of pulse energization are adjusted so that the bit-error rate is optimal or within the specified range.

Figure 14:
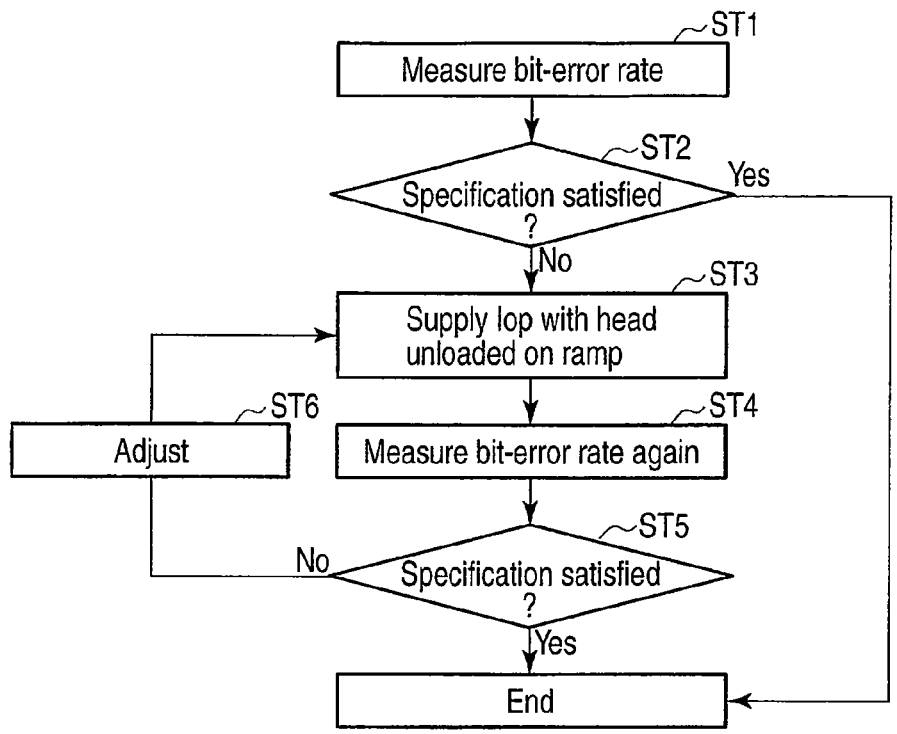
FIG. 14 is an exemplary flowchart showing a process for energizing the main pole as one of manufacturing processes for the HDD.

The adjustment of current Iop, setup times, and the frequency of pulse energization can be performed during the manufacture or operation of the HDD. In manufacturing processes for the HDD, as shown in FIG. 14, the bit-error rate is measured and recorded in an initial state (ST1). It is determined whether or not the bit-error rate ER is within a predetermined threshold, that is, whether or not it conforms to its specification (ST2). If the specification is satisfied, the manufacturing processes are completed. If not, current Iop is supplied in any of the current patterns shown in FIGS. 10 to 13 to the main pole 2 of the recording head 56 with the magnetic head 33 unloaded on a ramp (ST3). Thereafter, the bit-error rate is measured again without the supply of current Iop (ST4). It is determined whether or not the bit-error rate ER conforms to the specification (ST5). If the specification is satisfied, the manufacturing processes are completed.

If the specification is not satisfied, current Iop, setup times, and the frequency of pulse energization are adjusted (ST6), and thereafter, ST3 to ST6 are repeated so that the bit-error rate reaches the range of the specification.

Figure 15:
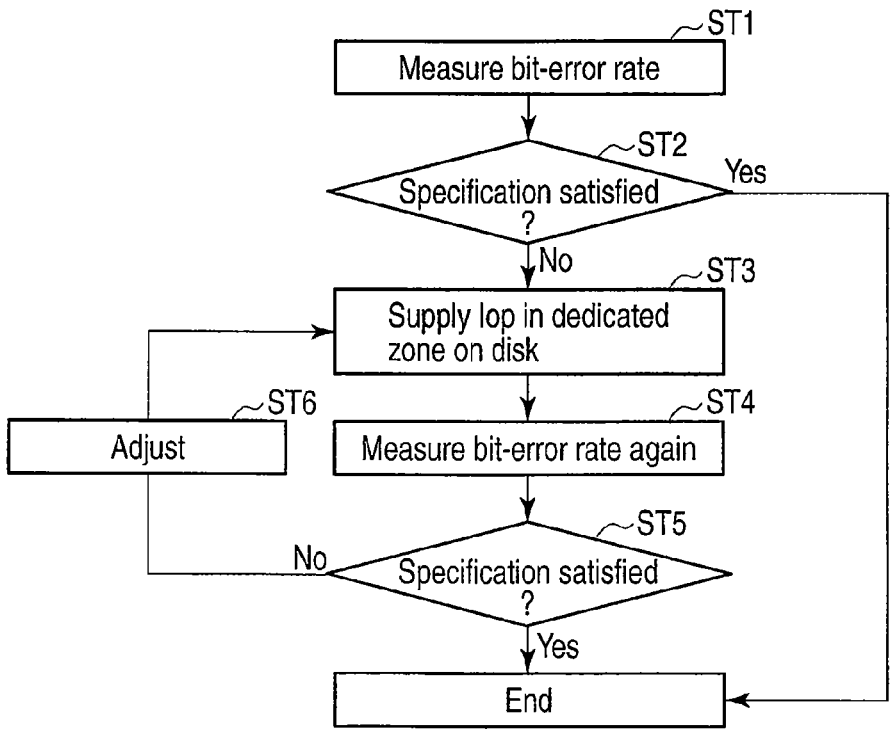
FIG. 15 is an exemplary flowchart showing a process for energizing the main pole as one of the manufacturing processes for the HDD.

In ST3, as shown in FIG. 15, current Iop may be supplied to the main pole 2 of the recording head 56 with the magnetic head 33 disposed on its dedicated zone of the magnetic disk 12 so that the bit-error rate can be measured thereafter.

Figure 16:
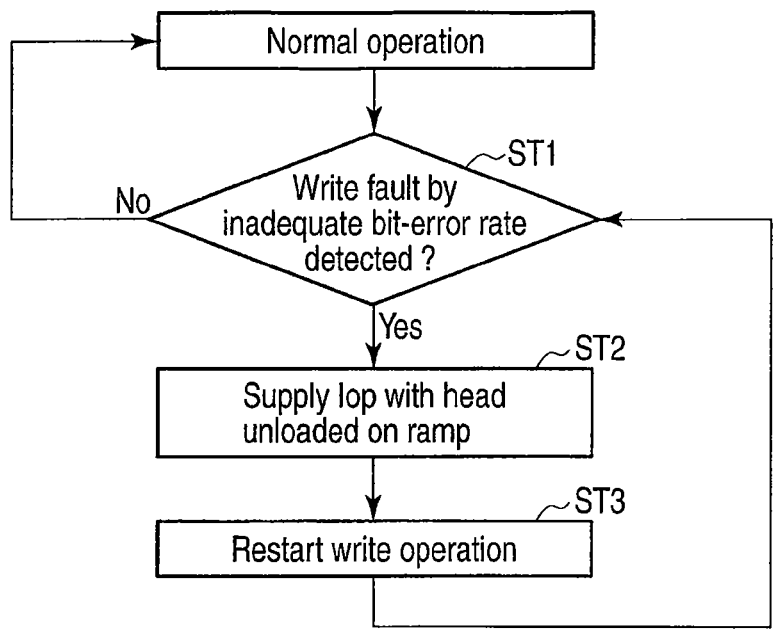
FIG. 16 is an exemplary flowchart showing a process for energizing the main pole during operation of the HDD.

As shown in FIG. 16, the HDD is normally operated without the supply of current Iop to the main pole 2. If a write fault attributable to an inadequate bit-error rate is detected by the control unit 82 (ST1), current Iop is supplied, for example, in any of the current patterns shown in FIGS. 10 to 13 to the main pole 2 with the magnetic head 33 unloaded on the ramp (ST2). Thereafter, the write operation by the magnetic head 33 is restarted (ST3), whereupon ST1 to ST3 are repeated so that the write fault attributable to the inadequate bit-error rate is removed.

Figure 17:
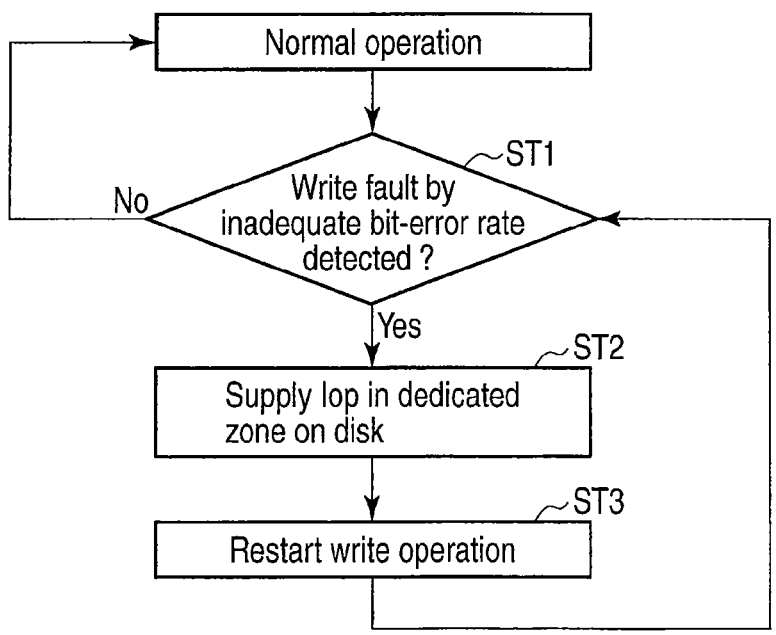
FIG. 17 is an exemplary flowchart showing a process for energizing the main pole during operation of the HDD.

In ST2, as shown in FIG. 17, current Iop may be supplied in any of the current patterns shown in FIGS. 10 to 13 to the main pole 2 of the recording head 56 with the magnetic head 33 disposed on its dedicated zone of the magnetic disk 12.

According to the magnetic heads constructed in this manner and the HDD provided with the same, the electrically conductive layer consisting only of a nonmagnetic electrical conductor is provided between the return and main poles, in the vicinity of the ABS of the main pole. With this arrangement, the current drive can prevent the magnetic domain wall from being pinned within the main pole during signal recording, thereby suppressing a multi-domain structure within the main pole. In this way, the recording magnetic flux can be facilitated to be stably guided to the distal end of the main pole, so that a stable magnetic field can be applied to the magnetic disk, and degradation of the signal-to-noise ratio can be prevented.

The following is a description of magnetic heads of HDDs according to alternative embodiments. In the description of these alternative embodiments to follow, like reference numbers are used to designate the same parts as those of the first embodiment, and a detailed description thereof is omitted.

(Second Embodiment)

Figure 18:
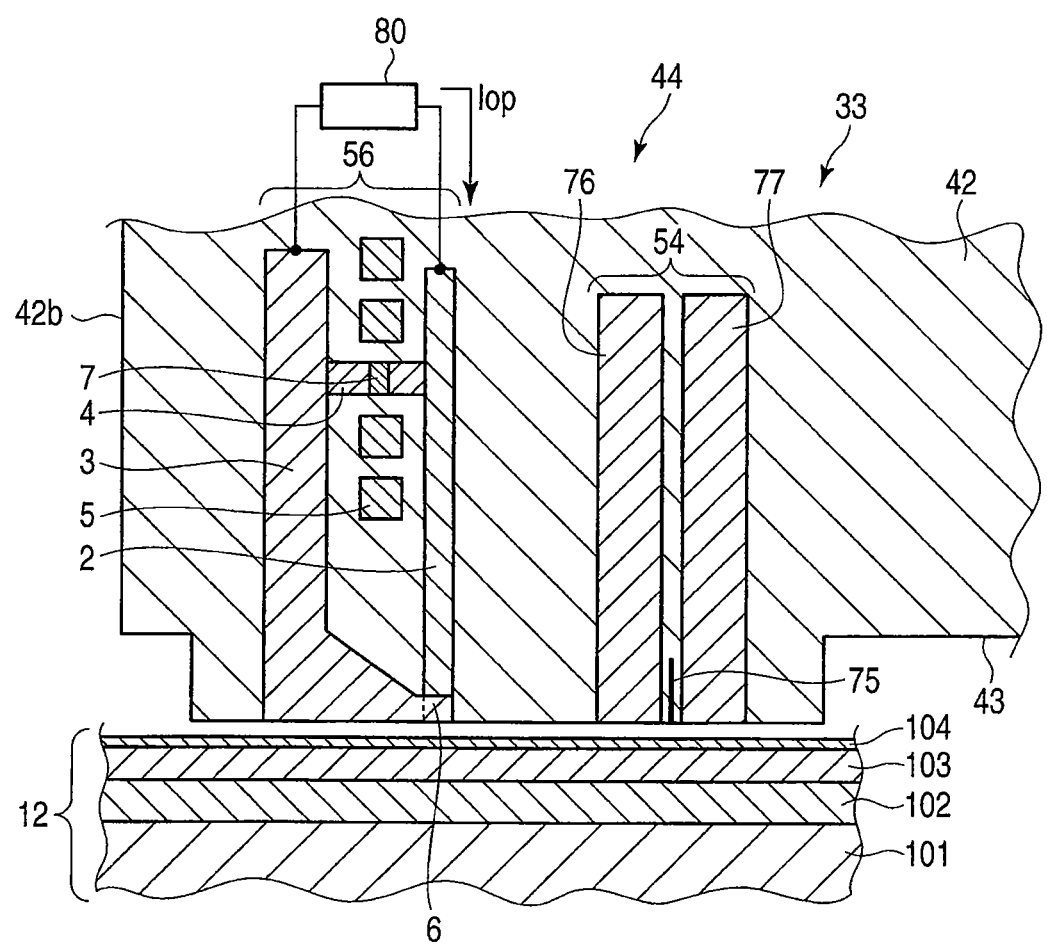
FIG. 18 is an exemplary sectional view showing a magnetic head of an HDD according to a second embodiment.
Figure 19:
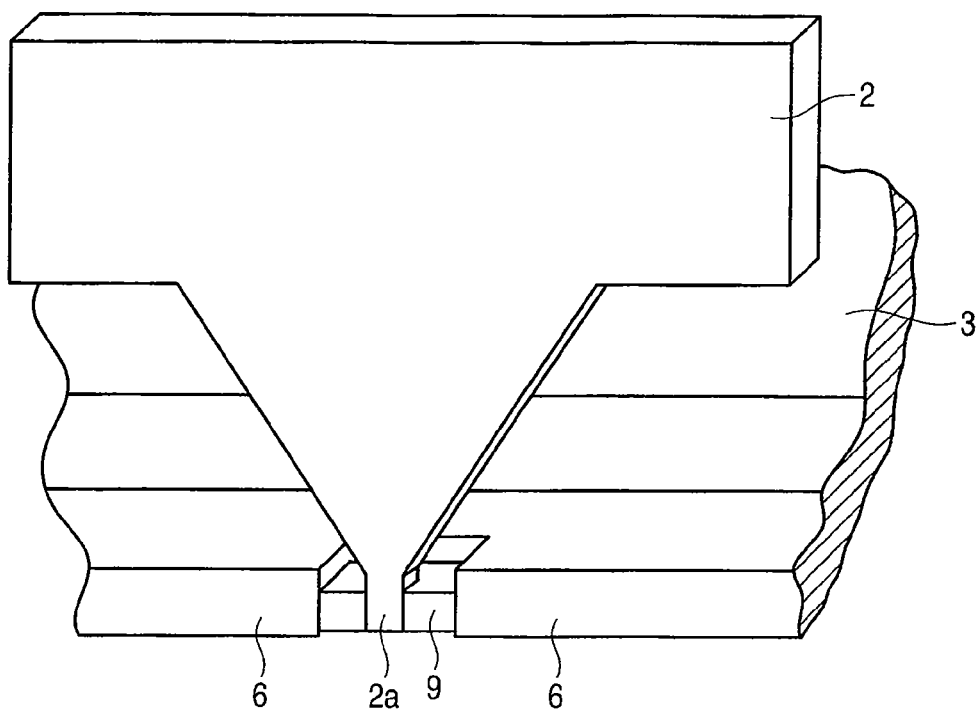
FIG. 19 is an exemplary perspective view schematically showing a recording head of the second embodiment.
Figure 20:
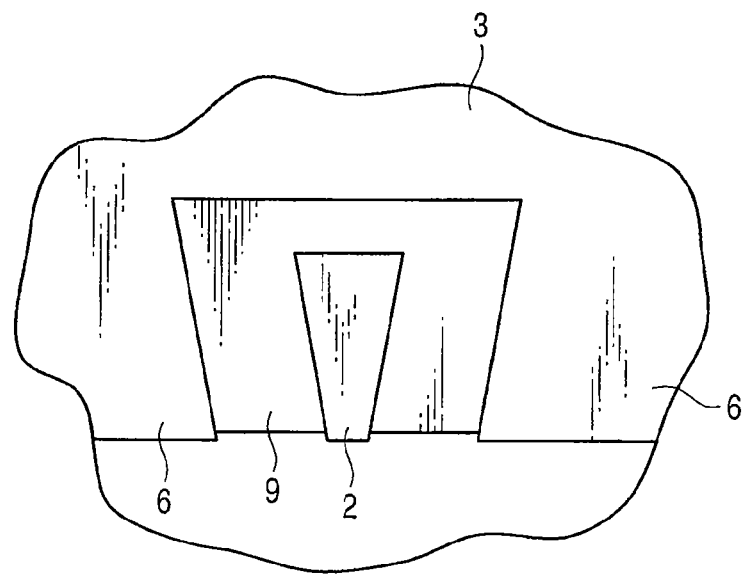
FIG. 20 is an exemplary plan view of the recording head of the second embodiment taken from the ABS side.

FIG. 18 is a sectional view showing a magnetic head of an HDD according to a second embodiment, FIG. 19 is a perspective view schematically showing a recording head 56 of the magnetic head, and FIG. 20 is a plan view of the recording head taken from the ABS side of a slider.

According to the second embodiment, as shown in FIGS. 18 to 20, the recording head 56 of a magnetic head 33 comprises a magnetic core and recording coil 5. The magnetic core comprises a main pole 2, return pole 3, junction 4, and side shields 6. The main pole 2 has soft magnetic properties and serves to record a signal on a magnetic disk 12. The return pole 3 is disposed on the trailing side of the main pole 2. The junction 4 connects the respective upper portions of the main and return poles 2 and 3 and comprises an insulating layer 7 for electrically insulating the poles 2 and 3 from each other. The side shields 6 are disposed at least partially on the opposite sides of the main pole 2 transversely relative to the track such that they are connected to the return pole 3 and constitute second return poles. The recording coil 5 is disposed such that it is wound around the magnetic core. The distal end surface of the main pole 2 and the respective lower end surfaces of the return pole 3 and side shields 6 are exposed in an ABS 43 of a slider 42. The recording head 56 comprises a nonmagnetic electrically conductive layer 9 and current source 80. The conductive layer 9 is formed between the distal end portion of the main pole 2 and the return pole 3 and side shields 6, in the vicinity of the ABS 43, such that it electrically connects these elements. The current source 80 is connected to the main and return poles 2 and 3. The material of the conductive layer 9 may be copper, silver, gold, aluminum, or Nichrome. Only the conductive layer 9 is interposed between the distal end portion of the main pole 2 and the return pole 3 and side shields 6. Further, the conductive layer 9 may be recessed from the ABS, or a protective layer, such as a DLC film, may be introduced on the side of that surface of the conductive layer 9 which faces the magnetic disk 12.

In the second embodiment, an alternating current is passed through the recording coil 5, whereupon data is written to the magnetic disk 12 by means of a magnetic field from the main pole 2. Further, current Iop from the current source 80 is passed through an electrical circuit in which the main pole 2, nonmagnetic electrically conductive layer 9, return pole 3, and side shields 6 are connected in series. The reproduction head 54 reproduces the data recorded on the magnetic disk 12.

According to the arrangement described above, current Iop is introduced into the main pole 2 so that transmission-type spin torque is induced in response to magnetization in the main pole. Thereupon, the magnetic domain wall in the main pole 2 is actuated so that magnetization pinning within a pinning site can be canceled and the magnetization responds in the same direction as the direction of main pole magnetization. In this way, a head field can be stably generated from the distal end of the main pole 2. Consequently, the bit-error rate during the Iop supply can be considerably improved.

(Third Embodiment)

Figure 21:
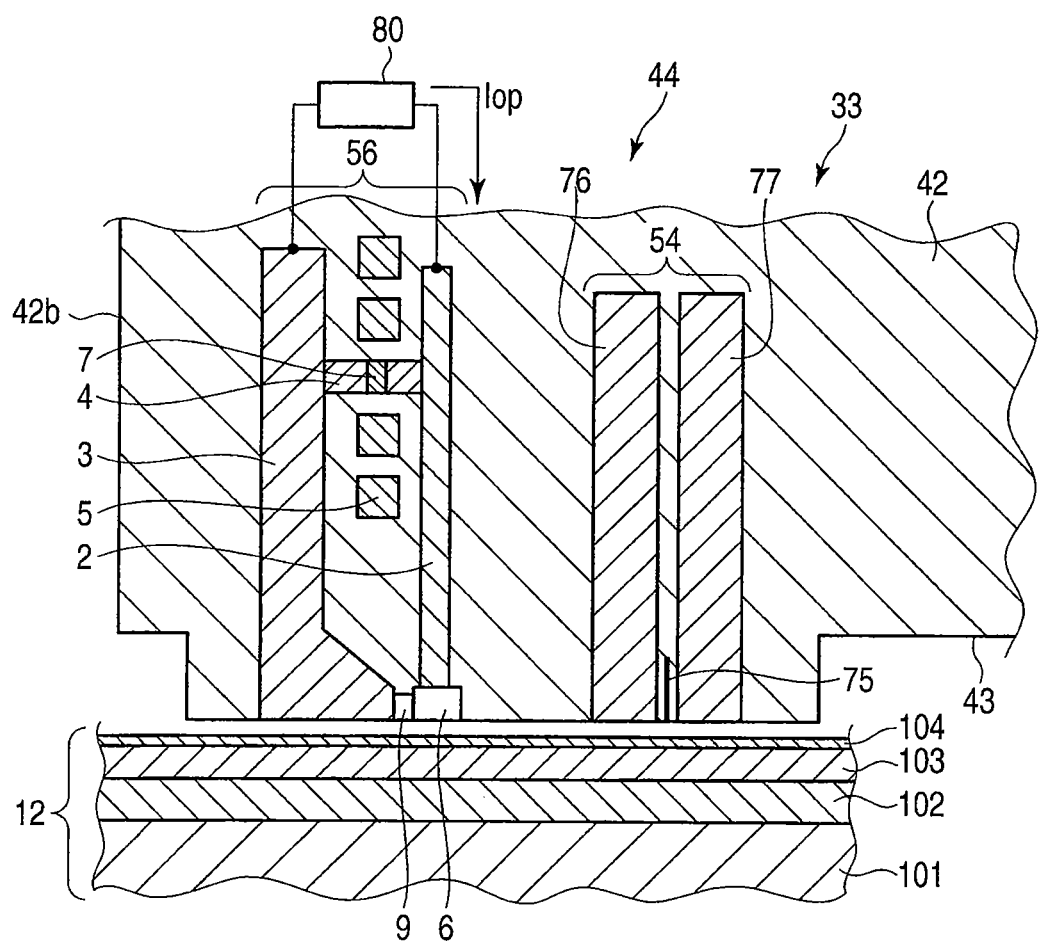
FIG. 21 is an exemplary sectional view showing a magnetic head of an HDD according to a third embodiment.
Figure 22:
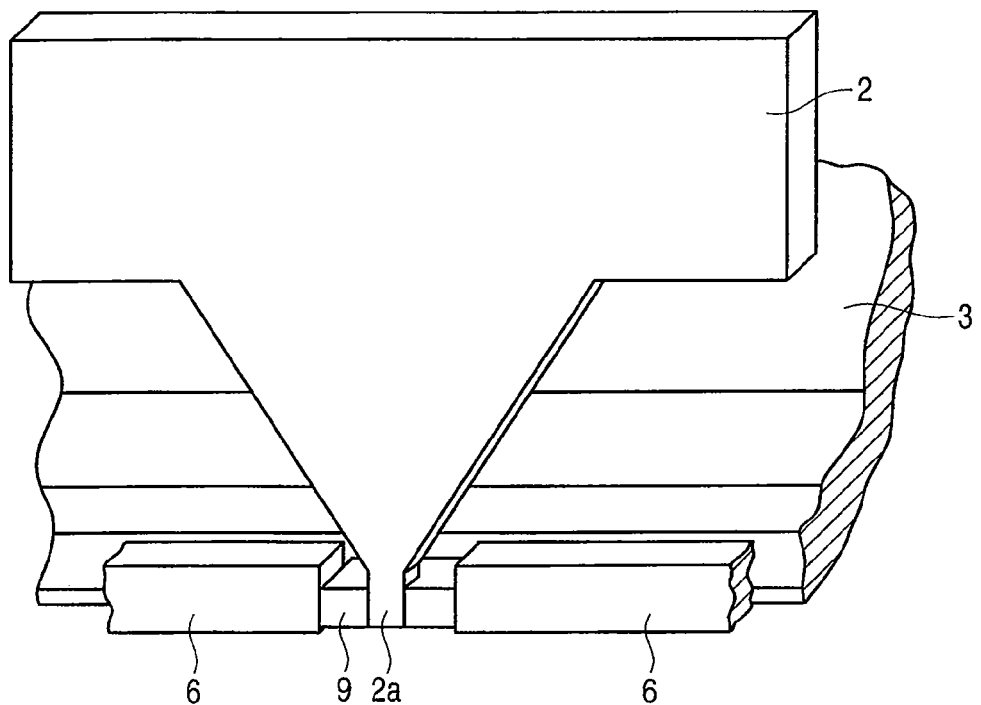
FIG. 22 is an exemplary perspective view schematically showing a recording head of the third embodiment.
Figure 23:
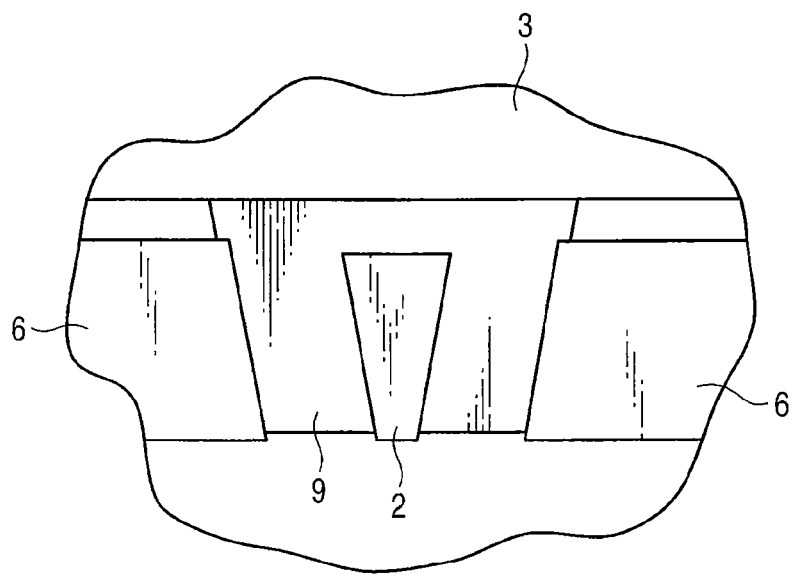
FIG. 23 is an exemplary plan view of the recording head of the third embodiment taken from the ABS side.

FIG. 21 is a sectional view showing a magnetic head of an HDD according to a third embodiment, FIG. 22 is a perspective view schematically showing a recording head 56 of the magnetic head, and FIG. 23 is a plan view of the recording head taken from the ABS side of a slider.

According to the third embodiment, as shown in FIGS. 21 to 23, the recording head 56 of a magnetic head 33 comprises a magnetic core and recording coil 5. The magnetic core comprises a main pole 2, return pole 3, junction 4, and side shields 6. The main pole 2 has soft magnetic properties and serves to record a signal on a magnetic disk 12. The return pole 3 is disposed on the trailing side of the main pole 2. The junction 4 connects the respective upper portions of the main and return poles 2 and 3 and comprises an insulating layer 7 for electrically insulating the poles 2 and 3 from each other. The side shields 6 are disposed at least partially on the opposite sides of the main pole 2 transversely relative to the track such that they are magnetically separated from the return pole 3 and constitute second return poles. The recording coil 5 is disposed such that it is wound around the magnetic core. The distal end surface of the main pole 2 and the respective lower end surfaces of the return pole 3 and side shields 6 are exposed in an ABS 43 of a slider 42. The recording head 56 comprises a nonmagnetic electrically conductive layer 9 and current source 80. The conductive layer 9 is formed between the distal end portion of the main pole 2 and the return pole 3 and side shields 6, in the vicinity of the ABS 43, such that it electrically connects these elements. The current source 80 is connected to the main and return poles 2 and 3. The material of the conductive layer 9 may be copper, silver, gold, aluminum, or Nichrome. Only the conductive layer 9 is interposed between the distal end portion of the main pole 2 and the return pole 3 and side shields 6. Further, the conductive layer 9 may be recessed from the ABS, or a protective layer, such as a DLC film, may be introduced on the side of that surface of the conductive layer 9 which faces the magnetic disk 12.

In the third embodiment, an alternating current is passed through the recording coil 5, whereupon data is written to the magnetic disk 12 by means of a magnetic field from the main pole 2. Further, current Iop from the current source 80 is passed through an electrical circuit in which the main pole 2, nonmagnetic electrically conductive layer 9, return pole 3, and side shields 6 are connected in series. The reproduction head 54 reproduces the data recorded on the magnetic disk 12.

According to the arrangement described above, current Iop is introduced into the main pole 2 so that transmission-type spin torque is induced in response to magnetization in the main pole. Thereupon, the magnetic domain wall in the main pole 2 is actuated so that magnetization pinning within a pinning site can be canceled and the magnetization responds in the same direction as the direction of main pole magnetization. In this way, a head field can be stably generated from the distal end of the main pole 2. Consequently, the bit-error rate during the Iop supply can be considerably improved.

(Fourth Embodiment)

FIG. 24 is a sectional view showing a magnetic head of an HDD according to a fourth embodiment, and FIG. 25 is a plan view of a recording head taken from the ABS side of a slider.

According to the fourth embodiment, as shown in FIGS. 24 and 25, a recording head 56 of a magnetic head 33 comprises a magnetic core, recording coil 5, and side shields 6. The magnetic core comprises a main pole 2, return pole 3, and junction 4. The main pole 2 has soft magnetic properties and serves to record a signal on a magnetic disk 12. The return pole 3 is disposed on the trailing side of the main pole 2. The junction 4 connects the respective upper portions of the main and return poles 2 and 3. The recording coil 5 is disposed such that it is wound around the magnetic core. The side shields 6 are disposed at least partially on the opposite sides of the main pole 2 transversely relative to the track such that they are magnetically separated from the return pole 3 and constitute second return poles. The distal end surface of the main pole 2 and the respective lower end surfaces of the return pole 3 and side shields 6 are exposed in an ABS 43 of a slider 42. The recording head 56 comprises a nonmagnetic electrically conductive layer 9 and current source 80. The conductive layer 9 is formed between the distal end portion of the main pole 2 and the side shields 6, in the vicinity of the ABS 43, such that it electrically connects these elements. The current source 80 is connected to the main pole 2 and the side shields 6. The material of the conductive layer 9 may be copper, silver, gold, aluminum, or Nichrome. Only the conductive layer 9 is interposed between the distal end portion of the main pole 2 and the side shields 6. Further, the conductive layer 9 may be recessed from the ABS, or a protective layer, such as a DLC film, may be introduced on the side of that surface of the conductive layer 9 which faces the magnetic disk 12.

In the fourth embodiment, an alternating current is passed through the recording coil 5, whereupon data is written to the magnetic disk 12 by means of a magnetic field from the main pole 2. Further, current Iop from the current source 80 is passed through an electrical circuit in which the main pole 2, nonmagnetic electrically conductive layer 9, and side shields 6 are connected in series. The reproduction head 54 reproduces the data recorded on the magnetic disk 12.

According to the arrangement described above, current Iop is introduced into the main pole 2 so that transmission-type spin torque is induced in response to magnetization in the main pole. Thereupon, the magnetic domain wall in the main pole 2 is actuated so that magnetization pinning within a pinning site can be canceled and the magnetization responds in the same direction as the direction of main pole magnetization. In this way, a head field can be stably generated from the distal end of the main pole 2. Consequently, the bit-error rate during the Iop supply can be considerably improved. Further, the junction 4 of the magnetic core need not be provided with an insulating layer, so that the recording capacity of the recording head 56 can be improved.

(Fifth Embodiment)

Figure 26:
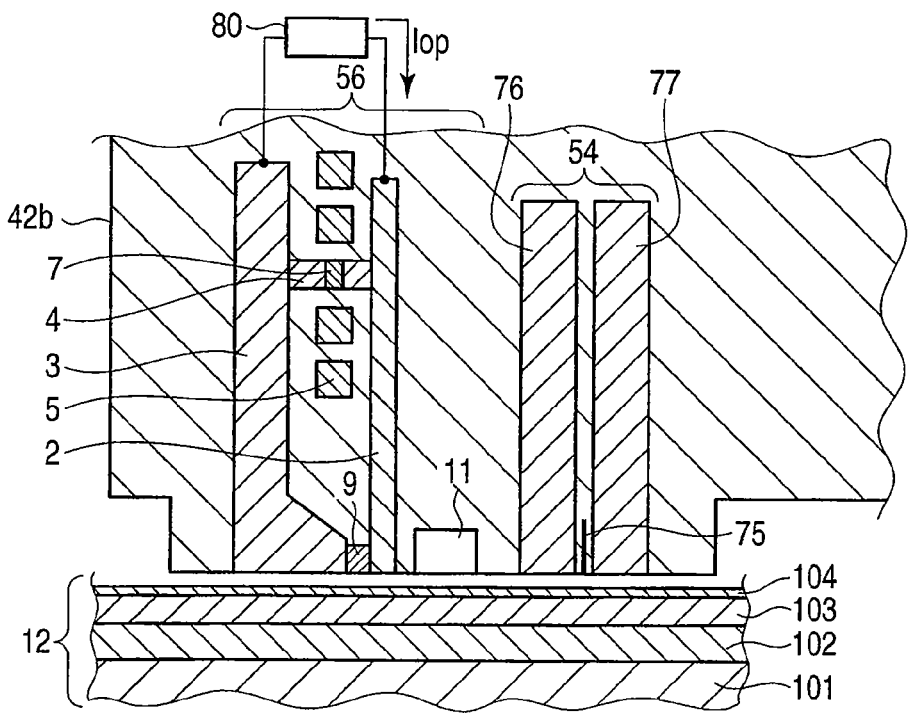
FIG. 26 is an exemplary sectional view showing a magnetic head of an HDD according to a fifth embodiment.

FIG. 26 is a sectional view showing a magnetic head of an HDD according to a fifth embodiment.

According to the fifth embodiment, a recording head 56 of a magnetic head 33 comprises a magnetic core, recording coil 5, and shield 11. The magnetic core comprises a main pole 2, return pole 3, and junction 4. The main pole 2 has soft magnetic properties and serves to record a signal on a magnetic disk 12. The return pole 3 is disposed on the trailing side of the main pole 2. The junction 4 connects the respective upper portions of the main and return poles 2 and 3 and comprises an insulating layer 7 for electrically insulating the poles 2 and 3 from each other. The recording coil 5 is disposed such that it is wound around the magnetic core. The shield 11 is disposed on the leading side of the main pole 2 such that it is magnetically separated from the return pole 3 and constitutes a third return pole. The distal end surface of the main pole 2 and the respective lower end surfaces of the return pole 3 and shield 11 are exposed in an ABS 43 of a slider 42. The recording head 56 comprises a nonmagnetic electrically conductive layer 9 and current source 80. The conductive layer 9 is formed between the distal end portion of the main pole 2 and the return pole 3, in the vicinity of the ABS 43, such that it electrically connects these elements. The current source 80 is connected to the main and return poles 2 and 3. The material of the conductive layer 9 may be copper, silver, gold, aluminum, or Nichrome. Only the conductive layer 9 is interposed between the distal end portion of the main pole 2 and the return pole 3. Further, the conductive layer 9 may be recessed from the ABS, or a protective layer, such as a DLC film, may be introduced on the side of that surface of the conductive layer 9 which faces the magnetic disk 12.

In the fifth embodiment, an alternating current is passed through the recording coil 5, whereupon data is written to the magnetic disk 12 by means of a magnetic field from the main pole 2. Further, current Iop from the current source 80 is passed through an electrical circuit in which the main pole 2, nonmagnetic electrically conductive layer 9, and return pole 3 are connected in series. The reproduction head 54 reproduces the data recorded on the magnetic disk 12.

According to the arrangement described above, current Iop is introduced into the main pole 2 so that transmission-type spin torque is induced in response to magnetization in the main pole. Thereupon, the magnetic domain wall in the main pole 2 is actuated so that magnetization pinning within a pinning site can be canceled and the magnetization responds in the same direction as the direction of main pole magnetization. In this way, a head field can be stably generated from the distal end of the main pole 2. Consequently, the bit-error rate during the Iop supply can be considerably improved.

(Sixth Embodiment)

Figure 27:
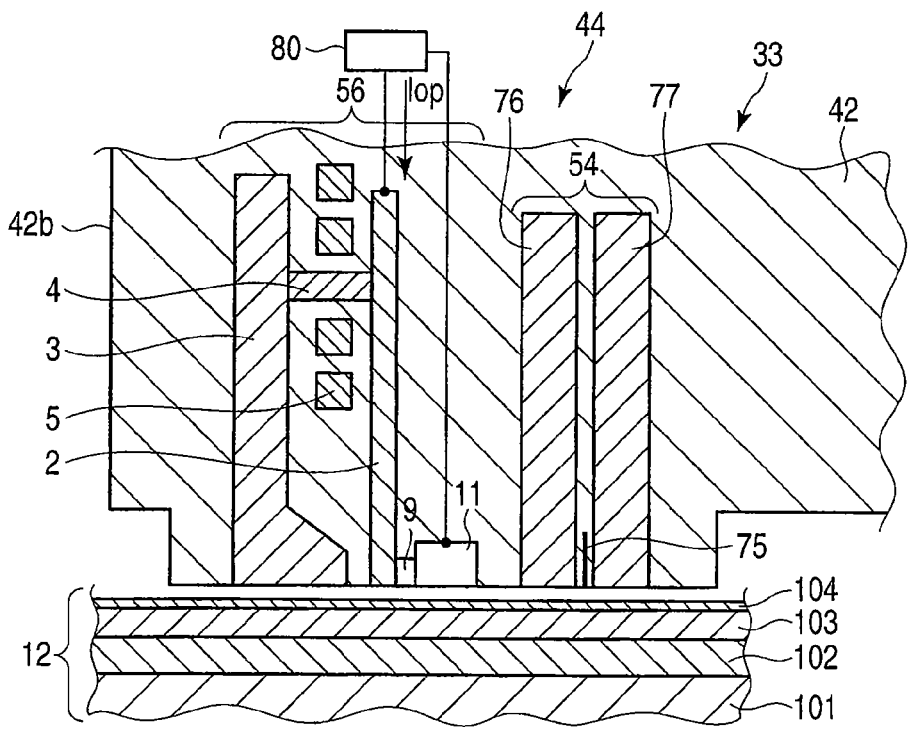
FIG. 27 is an exemplary sectional view showing a magnetic head of an HDD according to a sixth embodiment.

FIG. 27 is a sectional view showing a magnetic head of an HDD according to a sixth embodiment.

According to the sixth embodiment, a recording head 56 of a magnetic head 33 comprises a magnetic core, recording coil 5, and shield 11. The magnetic core comprises a main pole 2, return pole 3, and junction 4. The main pole 2 has soft magnetic properties and serves to record a signal on a magnetic disk 12. The return pole 3 is disposed on the trailing side of the main pole 2. The junction 4 connects the respective upper portions of the main and return poles 2 and 3. The recording coil 5 is disposed such that it is wound around the magnetic core. The shield 11 is disposed on the leading side of the main pole 2 such that it is magnetically separated from the return pole 3 and constitutes a third return pole. The distal end surface of the main pole 2 and the respective lower end surfaces of the return pole 3 and shield 11 are exposed in an ABS 43 of a slider 42. The recording head 56 comprises a nonmagnetic electrically conductive layer 9 and current source 80. The conductive layer 9 is formed between the distal end portion of the main pole 2 and the shield 11, in the vicinity of the ABS 43, such that it electrically connects these elements with the main and return poles 2 and 3 electrically insulated from each other. The current source 80 is connected to the main pole 2 and shield 11. The material of the conductive layer 9 may be copper, silver, gold, aluminum, or Nichrome. Only the conductive layer 9 is interposed between the distal end portion of the main pole 2 and the return pole 3. Further, the conductive layer 9 may be recessed from the ABS, or a protective layer, such as a DLC film, may be introduced on the side of that surface of the conductive layer 9 which faces the magnetic disk 12.

In the sixth embodiment, an alternating current is passed through the recording coil 5, whereupon data is written to the magnetic disk 12 by means of a magnetic field from the main pole 2. Further, current Iop from the current source 80 is passed through an electrical circuit in which the main pole 2, nonmagnetic electrically conductive layer 9, and shield 11 are connected in series. The reproduction head 54 reproduces the data recorded on the magnetic disk 12.

According to the arrangement described above, current Iop is introduced into the main pole 2 so that transmission-type spin torque is induced in response to magnetization in the main pole. Thereupon, the magnetic domain wall in the main pole 2 is actuated so that magnetization pinning within a pinning site can be canceled and the magnetization responds in the same direction as the direction of main pole magnetization. In this way, a head field can be stably generated from the distal end of the main pole 2. Consequently, the bit-error rate during the Iop supply can be considerably improved. Further, the junction 4 of the magnetic core need not be provided with an insulating layer, so that the recording capacity of the recording head 56 can be improved.

(Seventh Embodiment)

Figure 28:
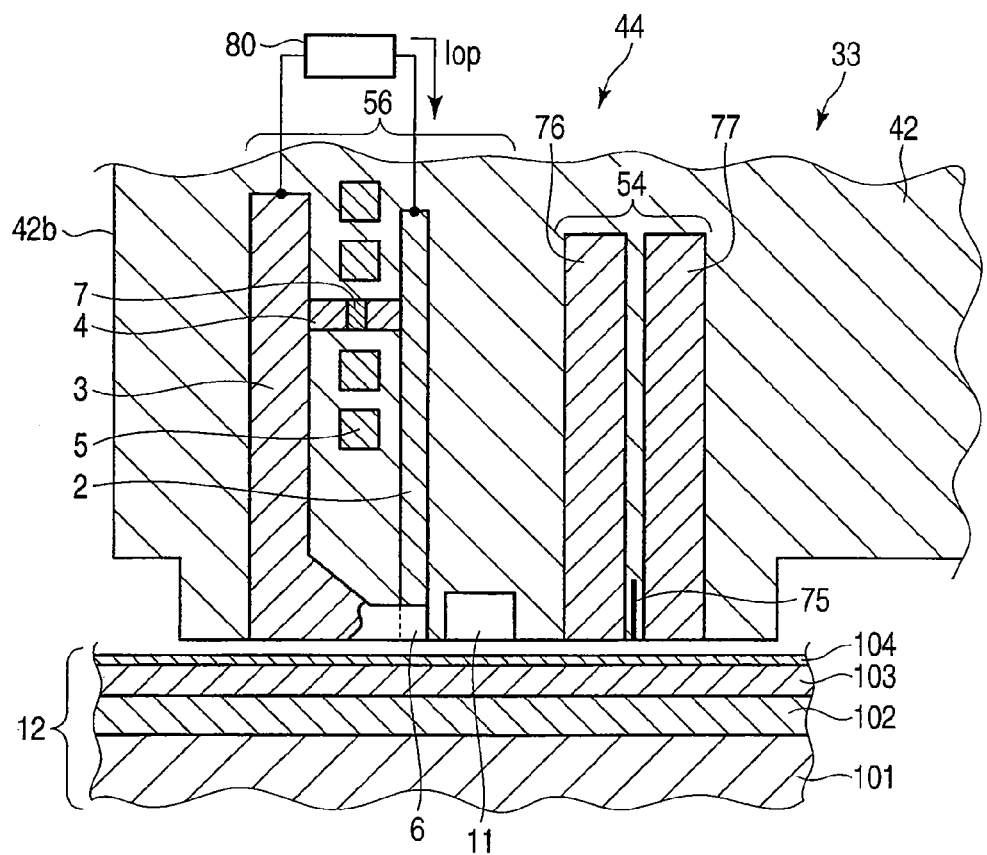
FIG. 28 is a sectional view showing a magnetic head of an HDD according to a seventh embodiment.
Figure 29:
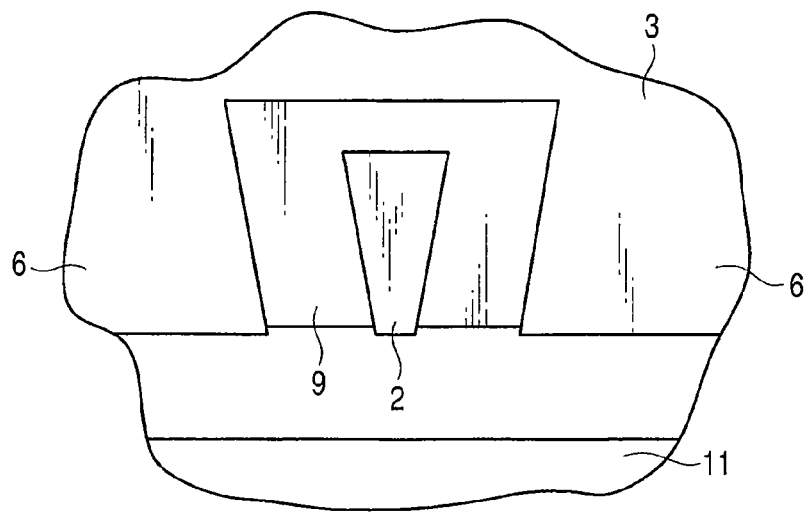
FIG. 29 is an exemplary plan view of a recording head of the seventh embodiment taken from the ABS side.

FIG. 28 is a sectional view showing a magnetic head of an HDD according to a seventh embodiment, and FIG. 29 is a plan view of a recording head taken from the ABS side of a slider.

According to the seventh embodiment, a recording head 56 of a magnetic head 33 comprises a magnetic core, recording coil 5, and shield 11. The magnetic core comprises a main pole 2, return pole 3, junction 4, and side shields 6. The main pole 2 has soft magnetic properties and serves to record a signal on a magnetic disk 12. The return pole 3 is disposed on the trailing side of the main pole 2. The junction 4 connects the respective upper portions of the main and return poles 2 and 3 and comprises an insulating layer 7 for electrically insulating the poles 2 and 3 from each other. The side shields 6 are disposed at least partially on the opposite sides of the main pole 2 transversely relative to the track such that they are connected to the return pole 3 and constitute second return poles. The recording coil 5 is disposed such that it is wound around the magnetic core. The shield 11 is disposed on the leading side of the main pole 2 such that it is magnetically separated from the return pole 3 and constitutes a third return pole. The distal end surface of the main pole 2 and the respective lower end surfaces of the return pole 3, side shields 6, and shield 11 are exposed in an ABS 43 of a slider 42. The recording head 56 comprises a nonmagnetic electrically conductive layer 9 and current source 80. The conductive layer 9 is formed between the distal end portion of the main pole 2 and the return pole 3 and side shields 6, in the vicinity of the ABS 43, such that it electrically connects these elements. The current source 80 is connected to the main and return poles 2 and 3. The material of the conductive layer 9 may be copper, silver, gold, aluminum, or Nichrome. Only the conductive layer 9 is interposed between the distal end portion of the main pole 2 and the return pole 3 and side shields 6. Further, the conductive layer 9 may be recessed from the ABS, or a protective layer, such as a DLC film, may be introduced on the side of that surface of the conductive layer 9 which faces the magnetic disk 12.

In the seventh embodiment, an alternating current is passed through the recording coil 5, whereupon data is written to the magnetic disk 12 by means of a magnetic field from the main pole 2. Further, current Iop from the current source 80 is passed through an electrical circuit in which the main pole 2, nonmagnetic electrically conductive layer 9, return pole 3, and side shields 6 are connected in series. The reproduction head 54 reproduces the data recorded on the magnetic disk 12.

According to the arrangement described above, current Iop is introduced into the main pole 2 so that transmission-type spin torque is induced in response to magnetization in the main pole. Thereupon, the magnetic domain wall in the main pole 2 is actuated so that magnetization pinning within a pinning site can be canceled and the magnetization responds in the same direction as the direction of main pole magnetization. In this way, a head field can be stably generated from the distal end of the main pole 2. Consequently, the bit-error rate during the Iop supply can be considerably improved.

(Eighth Embodiment)

FIG. 30 is a sectional view showing a magnetic head of an HDD according to an eighth embodiment, and FIG. 31 is a plan view of a recording head taken from the ABS side of a slider.

According to the eighth embodiment, a recording head 56 of a magnetic head 33 comprises a magnetic core, recording coil 5, and shield 11. The magnetic core comprises a main pole 2, return pole 3, junction 4, and side shields 6. The main pole 2 has soft magnetic properties and serves to record a signal on a magnetic disk 12. The return pole 3 is disposed on the trailing side of the main pole 2. The junction 4 connects the respective upper portions of the main and return poles 2 and 3 and comprises an insulating layer 7 for electrically insulating the poles 2 and 3 from each other. The side shields 6 are disposed at least partially on the opposite sides of the main pole 2 transversely relative to the track such that they are connected to the return pole 3 and constitute second return poles. The recording coil 5 is disposed such that it is wound around the magnetic core. The shield 11 is disposed on the leading side of the main pole 2 such that it is magnetically separated from the return pole 3 and constitutes a third return pole. The distal end surface of the main pole 2 and the respective lower end surfaces of the return pole 3, side shields 6, and shield 11 are exposed in an ABS 43 of a slider 42. The recording head 56 comprises a nonmagnetic electrically conductive layer 9 and current source 80. The conductive layer 9 is formed between the distal end portion of the main pole 2 and the shield 11, in the vicinity of the ABS 43, such that it electrically connects these elements. The current source 80 is connected to the main pole 2 and shield 11. The material of the conductive layer 9 may be copper, silver, gold, aluminum, or Nichrome. Only the conductive layer 9 is interposed between the distal end portion of the main pole 2 and the side shields 6. Further, the conductive layer 9 may be recessed from the ABS, or a protective layer, such as a DLC film, may be introduced on the side of that surface of the conductive layer 9 which faces the magnetic disk 12.

In the eighth embodiment, an alternating current is passed through the recording coil 5, whereupon data is written to the magnetic disk 12 by means of a magnetic field from the main pole 2. Further, current Iop from the current source 80 is passed through an electrical circuit in which the main pole 2, nonmagnetic electrically conductive layer 9, and shield 11 are connected in series. The reproduction head 54 reproduces the data recorded on the magnetic disk 12.

According to the arrangement described above, current Iop is introduced into the main pole 2 so that transmission-type spin torque is induced in response to magnetization in the main pole. Thereupon, the magnetic domain wall in the main pole 2 is actuated so that magnetization pinning within a pinning site can be canceled and the magnetization responds in the same direction as the direction of main pole magnetization. In this way, a head field can be stably generated from the distal end of the main pole 2. Consequently, the bit-error rate during the Iop supply can be considerably improved. Further, the junction 4 of the magnetic core need not be provided with an insulating layer, so that the recording capacity of the recording head 56 can be improved.

(Ninth Embodiment)

Figure 32:
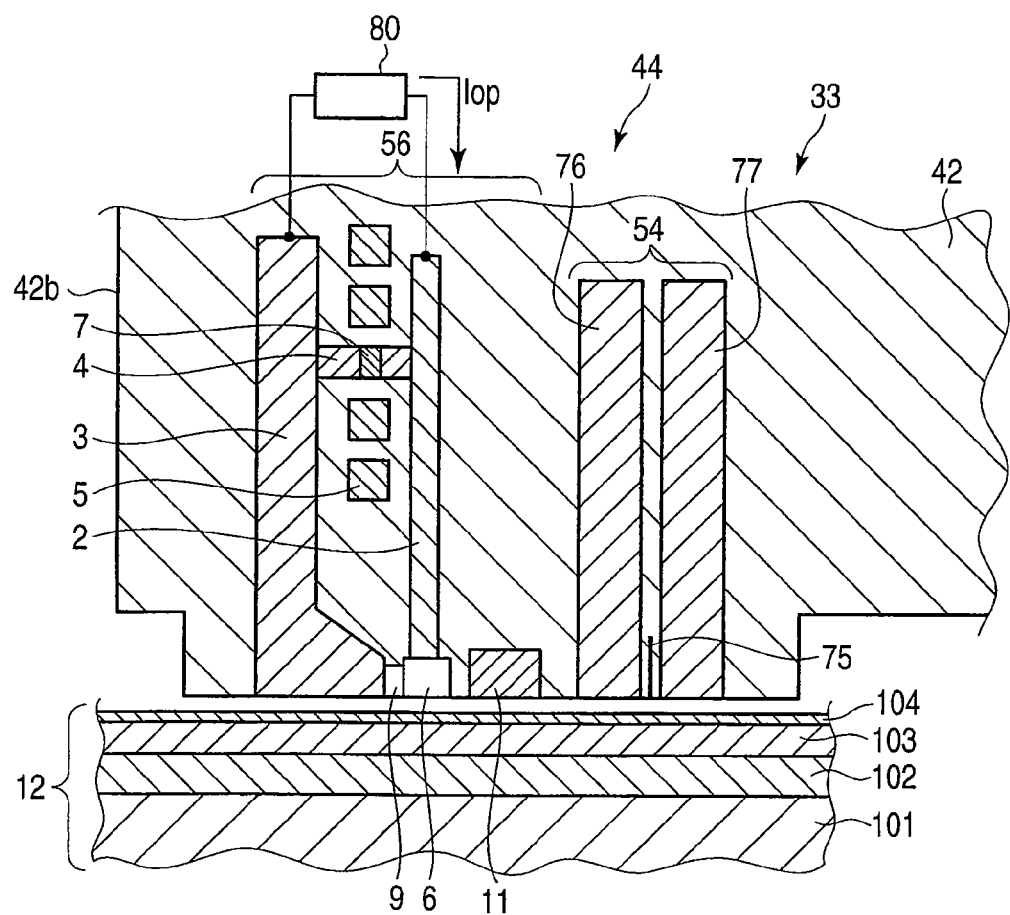
FIG. 32 is an exemplary sectional view showing a magnetic head of an HDD according to a ninth embodiment.
Figure 33:
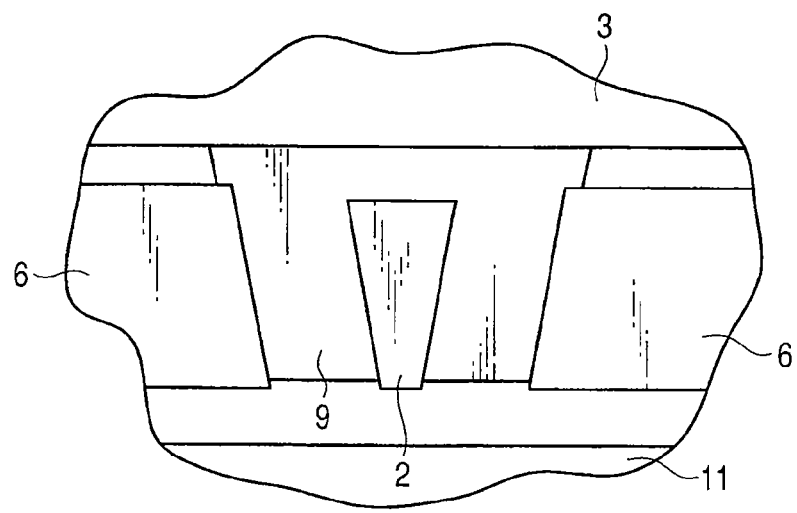
FIG. 33 is an exemplary plan view of a recording head of the ninth embodiment taken from the ABS side.

FIG. 32 is a sectional view showing a magnetic head of an HDD according to a ninth embodiment, and FIG. 33 is a plan view of a recording head taken from the ABS side of a slider.

According to the ninth embodiment, a recording head 56 of a magnetic head 33 comprises a magnetic core, recording coil 5, and shield 11. The magnetic core comprises a main pole 2, return pole 3, junction 4, and side shields 6. The main pole 2 has soft magnetic properties and serves to record a signal on a magnetic disk 12. The return pole 3 is disposed on the trailing side of the main pole 2. The junction 4 connects the respective upper portions of the main and return poles 2 and 3 and comprises an insulating layer 7 for electrically insulating the poles 2 and 3 from each other. The side shields 6 are disposed at least partially on the opposite sides of the main pole 2 transversely relative to the track such that they are magnetically separated from the return pole 3 and constitute second return poles. The recording coil 5 is disposed such that it is wound around the magnetic core. The shield 11 is disposed on the leading side of the main pole 2 such that it is magnetically separated from the return pole 3 and constitutes a third return pole. The distal end surface of the main pole 2 and the respective lower end surfaces of the return pole 3, side shields 6, and shield 11 are exposed in an ABS 43 of a slider 42. The recording head 56 comprises a nonmagnetic electrically conductive layer 9 and current source 80. The conductive layer 9 is formed between the distal end portion of the main pole 2 and the return pole 3 and side shields 6, in the vicinity of the ABS 43, such that it electrically connects these elements. The current source 80 is connected to the main and return poles 2 and 3. The material of the conductive layer 9 may be copper, silver, gold, aluminum, or Nichrome. Only the conductive layer 9 is interposed between the distal end portion of the main pole 2 and the return pole 3 and side shields 6. Further, the conductive layer 9 may be recessed from the ABS, or a protective layer, such as a DLC film, may be introduced on the side of that surface of the conductive layer 9 which faces the magnetic disk 12.

In the ninth embodiment, an alternating current is passed through the recording coil 5, whereupon data is written to the magnetic disk 12 by means of a magnetic field from the main pole 2. Further, current Iop from the current source 80 is passed through an electrical circuit in which the main pole 2, nonmagnetic electrically conductive layer 9, and side shields 6 are connected in series. The reproduction head 54 reproduces the data recorded on the magnetic disk 12.

According to the arrangement described above, current Iop is introduced into the main pole 2 so that transmission-type spin torque is induced in response to magnetization in the main pole. Thereupon, the magnetic domain wall in the main pole 2 is actuated so that magnetization pinning within a pinning site can be canceled and the magnetization responds in the same direction as the direction of main pole magnetization. In this way, a head field can be stably generated from the distal end of the main pole 2. Consequently, the bit-error rate during the Iop supply can be considerably improved.

(Tenth Embodiment)

Figure 34:
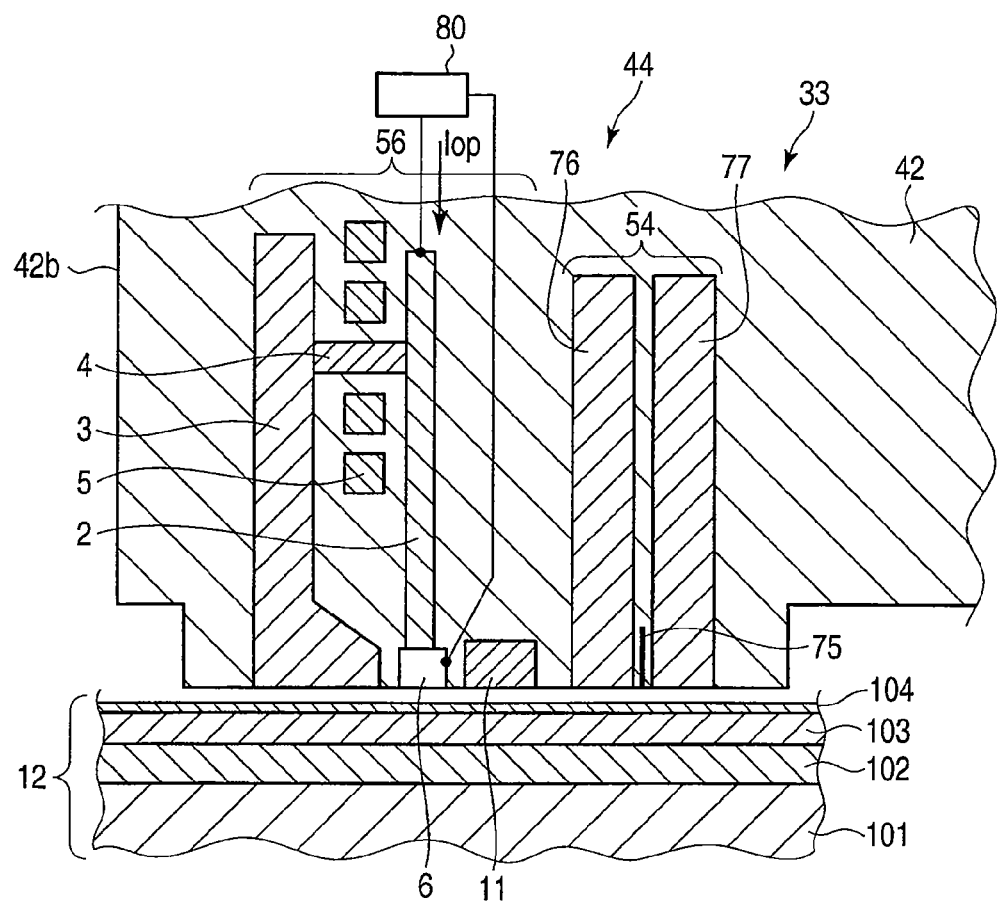
FIG. 34 is an exemplary sectional view showing a magnetic head of an HDD according to a tenth embodiment.
Figure 35:
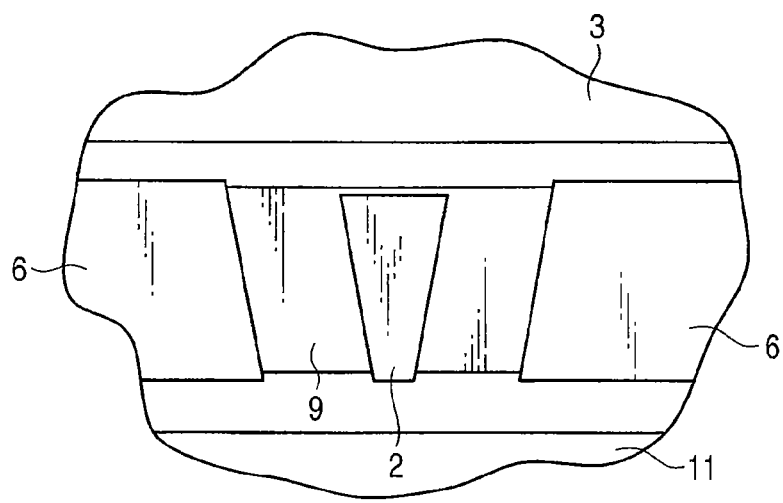
FIG. 35 is an exemplary plan view of a recording head of the tenth embodiment taken from the ABS side.

FIG. 34 is a sectional view showing a magnetic head of an HDD according to a tenth embodiment, and FIG. 35 is a plan view of a recording head taken from the ABS side of a slider.

According to the tenth embodiment, a recording head 56 of a magnetic head 33 comprises a magnetic core, recording coil 5, and shield 11. The magnetic core comprises a main pole 2, return pole 3, junction 4, and side shields 6. The main pole 2 has soft magnetic properties and serves to record a signal on a magnetic disk 12. The return pole 3 is disposed on the trailing side of the main pole 2. The junction 4 connects the respective upper portions of the main and return poles 2 and 3. The side shields 6 are disposed at least partially on the opposite sides of the main pole 2 transversely relative to the track such that they are magnetically separated from the return pole 3 and constitute second return poles. The recording coil 5 is disposed such that it is wound around the magnetic core. The shield 11 is disposed on the leading side of the main pole 2 such that it is magnetically separated from the return pole 3 and constitutes a third return pole. The distal end surface of the main pole 2 and the respective lower end surfaces of the return pole 3, side shields 6, and shield 11 are exposed in an ABS 43 of a slider 42.

The recording head 56 comprises a nonmagnetic electrically conductive layer 9 and current source 80. The conductive layer 9 is formed between the distal end portion of the main pole 2 and the side shields 6, in the vicinity of the ABS 43, such that it electrically connects these elements. The current source 80 is connected to the main pole 2 and side shields 6. The material of the conductive layer 9 may be copper, silver, gold, aluminum, or Nichrome. Only the conductive layer 9 is interposed between the distal end portion of the main pole 2 and the side shields 6. Further, the conductive layer 9 may be recessed from the ABS, or a protective layer, such as a DLC film, may be introduced on the side of that surface of the conductive layer 9 which faces the magnetic disk 12.

In the tenth embodiment, an alternating current is passed through the recording coil 5, whereupon data is written to the magnetic disk 12 by means of a magnetic field from the main pole 2. Further, current Iop from the current source 80 is passed through an electrical circuit in which the main pole 2, nonmagnetic electrically conductive layer 9, and side shields 6 are connected in series. The reproduction head 54 reproduces the data recorded on the magnetic disk 12.

According to the arrangement described above, current Iop is introduced into the main pole 2 so that transmission-type spin torque is induced in response to magnetization in the main pole. Thereupon, the magnetic domain wall in the main pole 2 is actuated so that magnetization pinning within a pinning site can be canceled and the magnetization responds in the same direction as the direction of main pole magnetization. In this way, a head field can be stably generated from the distal end of the main pole 2. Consequently, the bit-error rate during the Iop supply can be considerably improved. Further, the junction 4 of the magnetic core need not be provided with an insulating layer, so that the recording capacity of the recording head 56 can be improved.

(Eleventh Embodiment)

FIG. 36 is a sectional view showing a magnetic head of an HDD according to an eleventh embodiment, and FIG. 37 is a plan view of a recording head taken from the ABS side of a slider.

According to the eleventh embodiment, a recording head 56 of a magnetic head 33 comprises a magnetic core, recording coil 5, and shield 11. The magnetic core comprises a main pole 2, return pole 3, junction 4, and side shields 6. The main pole 2 has soft magnetic properties and serves to record a signal on a magnetic disk 12. The return pole 3 is disposed on the trailing side of the main pole 2. The junction 4 connects the respective upper portions of the main and return poles 2 and 3. The side shields 6 are disposed at least partially on the opposite sides of the main pole 2 transversely relative to the track such that they are magnetically separated from the return pole 3 and constitute second return poles. The recording coil 5 is disposed such that it is wound around the magnetic core. The shield 11 is disposed on the leading side of the main pole 2 such that it is magnetically separated from the return pole 3 and constitutes a third return pole. The distal end surface of the main pole 2 and the respective lower end surfaces of the return pole 3, side shields 6, and shield 11 are exposed in an ABS 43 of a slider 42.

The recording head 56 comprises a nonmagnetic electrically conductive layer 9 and current source 80. The conductive layer 9 is formed between the distal end portion of the main pole 2 and the side shields 6 and shield 11, in the vicinity of the ABS 43, such that it electrically connects these elements. The current source 80 is connected to the main pole 2 and shield 11. The material of the conductive layer 9 may be copper, silver, gold, aluminum, or Nichrome. Only the conductive layer 9 is interposed between the distal end portion of the main pole 2 and the side shields 6 and shield 11. Further, the conductive layer 9 may be recessed from the ABS, or a protective layer, such as a DLC film, may be introduced on the side of that surface of the conductive layer 9 which faces the magnetic disk 12.

In the eleventh embodiment, an alternating current is passed through the recording coil 5, whereupon data is written to the magnetic disk 12 by means of a magnetic field from the main pole 2. Further, current Iop from the current source 80 is passed through an electrical circuit in which the main pole 2, nonmagnetic electrically conductive layer 9, side shields 6, and shield 11 are connected in series. The reproduction head 54 reproduces the data recorded on the magnetic disk 12.

According to the arrangement described above, current Iop is introduced into the main pole 2 so that transmission-type spin torque is induced in response to magnetization in the main pole. Thereupon, the magnetic domain wall in the main pole 2 is actuated so that magnetization pinning within a pinning site can be canceled and the magnetization responds in the same direction as the direction of main pole magnetization. In this way, a head field can be stably generated from the distal end of the main pole 2. Consequently, the bit-error rate during the Iop supply can be considerably improved. Further, the junction 4 of the magnetic core need not be provided with an insulating layer, so that the recording capacity of the recording head 56 can be improved.

(Twelfth Embodiment)

Figure 38:
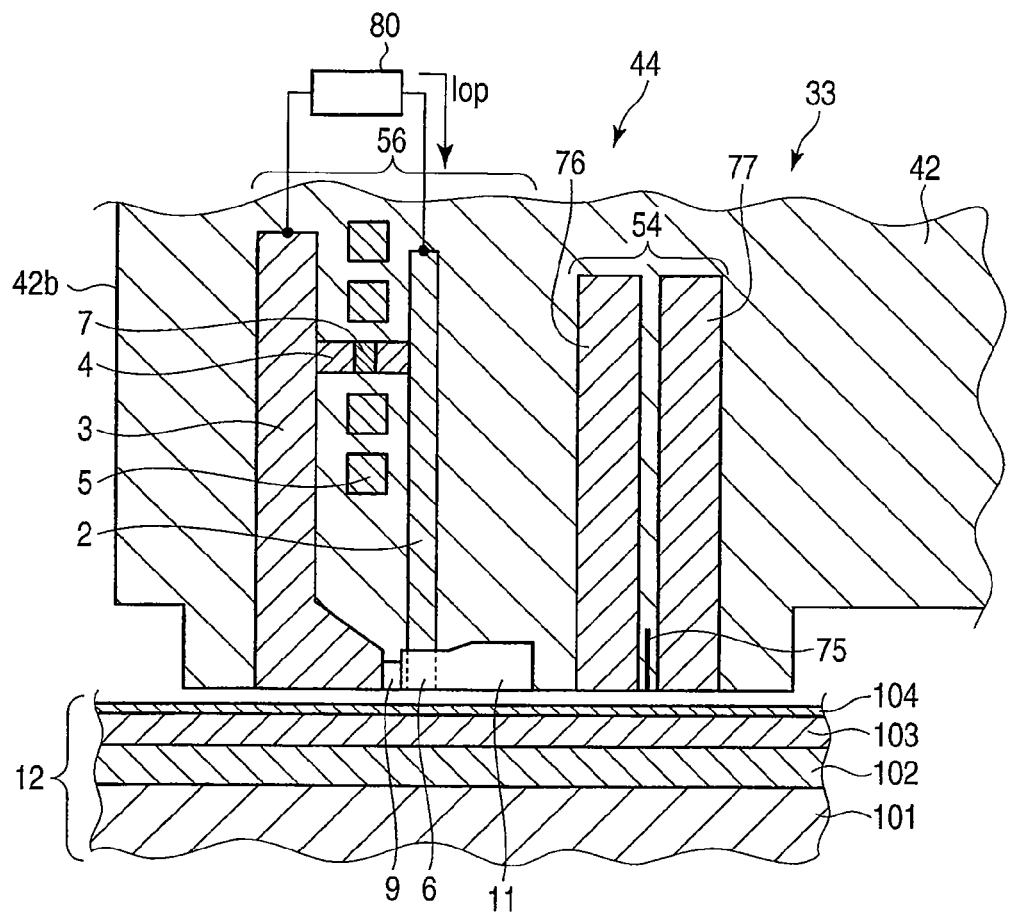
FIG. 38 is an exemplary sectional view showing a magnetic head of an HDD according to a twelfth embodiment.
Figure 39:
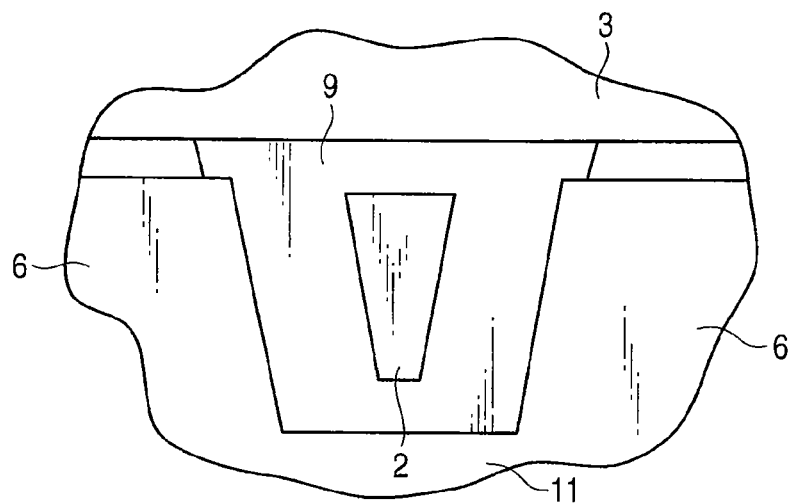
FIG. 39 is an exemplary plan view of a recording head of the twelfth embodiment taken from the ABS side.

FIG. 38 is a sectional view showing a magnetic head of an HDD according to a twelfth embodiment, and FIG. 39 is a plan view of a recording head taken from the ABS side of a slider.

According to the twelfth embodiment, a recording head 56 of a magnetic head 33 comprises a magnetic core and recording coil 5. The magnetic core comprises a main pole 2, return pole 3, junction 4, side shields 6, and shield 11. The main pole 2 has soft magnetic properties and serves to record a signal on a magnetic disk 12. The return pole 3 is disposed on the trailing side of the main pole 2. The junction 4 connects the respective upper portions of the main and return poles 2 and 3 and comprises an insulating layer 7. The side shields 6 are disposed at least partially on the opposite sides of the main pole 2 transversely relative to the track such that they are magnetically separated from the return pole 3 and constitute second return poles. The shield 11 is disposed on the leading side of the main pole 2 such that it is magnetically separated from the return pole 3 and connected to the side shields 6 and constitutes a third return pole. The recording coil 5 is disposed such that it is wound around the magnetic core. The distal end surface of the main pole 2 and the respective lower end surfaces of the return pole 3, side shields 6, and shield 11 are exposed in an ABS 43 of a slider 42.

The recording head 56 comprises a nonmagnetic electrically conductive layer 9 and current source 80. The conductive layer 9 is formed between the distal end portion of the main pole 2 and the return pole 3, side shields 6, and shield 11, in the vicinity of the ABS 43, such that it electrically connects these elements. The current source 80 is connected to the main and return poles 2 and 3. The material of the conductive layer 9 may be copper, silver, gold, aluminum, or Nichrome. Only the conductive layer 9 is interposed between the distal end portion of the main pole 2 and the side shields 6 and shield 11. Further, the conductive layer 9 may be recessed from the ABS, or a protective layer, such as a DLC film, may be introduced on the side of that surface of the conductive layer 9 which faces the magnetic disk 12.

In the twelfth embodiment, an alternating current is passed through the recording coil 5, whereupon data is written to the magnetic disk 12 by means of a magnetic field from the main pole 2. Further, current Iop from the current source 80 is passed through an electrical circuit in which the main pole 2, nonmagnetic electrically conductive layer 9, return pole 3, side shields 6, and shield 11 are connected in series. The reproduction head 54 reproduces the data recorded on the magnetic disk 12.

According to the arrangement described above, current Iop is introduced into the main pole 2 so that transmission-type spin torque is induced in response to magnetization in the main pole. Thereupon, the magnetic domain wall in the main pole 2 is actuated so that magnetization pinning within a pinning site can be canceled and the magnetization responds in the same direction as the direction of main pole magnetization. In this way, a head field can be stably generated from the distal end of the main pole 2. Consequently, the bit-error rate during the Iop supply can be considerably improved.

(Thirteenth Embodiment)

FIG. 40 is a sectional view showing a magnetic head of an HDD according to a thirteenth embodiment, and FIG. 41 is a plan view of a recording head taken from the ABS side of a slider.

According to the thirteenth embodiment, a recording head 56 of a magnetic head 33 comprises a magnetic core and recording coil 5. The magnetic core comprises a main pole 2, return pole 3, junction 4, side shields 6, and shield 11. The main pole 2 has soft magnetic properties and serves to record a signal on a magnetic disk 12. The return pole 3 is disposed on the trailing side of the main pole 2. The junction 4 connects the respective upper portions of the main and return poles 2 and 3. The side shields 6 are disposed at least partially on the opposite sides of the main pole 2 transversely relative to the track such that they are magnetically separated from the return pole 3 and constitute second return poles. The shield 11 is disposed on the leading side of the main pole 2 such that it is magnetically separated from the return pole 3 and connected to the side shields 6 and constitutes a third return pole. The recording coil 5 is disposed such that it is wound around the magnetic core. The distal end surface of the main pole 2 and the respective lower end surfaces of the return pole 3, side shields 6, and shield 11 are exposed in an ABS 43 of a slider 42.

The recording head 56 comprises a nonmagnetic electrically conductive layer 9 and current source 80. The conductive layer 9 is formed between the distal end portion of the main pole 2 and the side shields 6 and shield 11, in the vicinity of the ABS 43, such that it electrically connects these elements. The current source 80 is connected to the main pole 2 and shield 11. The material of the conductive layer 9 may be copper, silver, gold, aluminum, or Nichrome. Only the conductive layer 9 is interposed between the distal end portion of the main pole 2 and the side shields 6 and shield 11. Further, the conductive layer 9 may be recessed from the ABS, or a protective layer, such as a DLC film, may be introduced on the side of that surface of the conductive layer 9 which faces the magnetic disk 12.

In the thirteenth embodiment, an alternating current is passed through the recording coil 5, whereupon data is written to the magnetic disk 12 by means of a magnetic field from the main pole 2. Further, current Iop from the current source 80 is passed through an electrical circuit in which the main pole 2, nonmagnetic electrically conductive layer 9, side shields 6, and shield 11 are connected in series. The reproduction head 54 reproduces the data recorded on the magnetic disk 12.

According to the arrangement described above, current Iop is introduced into the main pole 2 so that transmission-type spin torque is induced in response to magnetization in the main pole. Thereupon, the magnetic domain wall in the main pole 2 is actuated so that magnetization pinning within a pinning site can be canceled and the magnetization responds in the same direction as the direction of main pole magnetization. In this way, a head field can be stably generated from the distal end of the main pole 2. Consequently, the bit-error rate during the Iop supply can be considerably improved. Further, the junction 4 of the magnetic core need not be provided with an insulating layer, so that the recording capacity of the recording head 56 can be improved.

(Fourteenth Embodiment)

FIG. 42 is a sectional view showing a magnetic head of an HDD according to a fourteenth embodiment, and FIG. 43 is a plan view of a recording head taken from the ABS side of a slider.

According to the fourteenth embodiment, a recording head 56 of a magnetic head 33 comprises a magnetic core and recording coil 5. The magnetic core comprises a main pole 2, return pole 3, junction 4, side shields 6, and shield 11. The main pole 2 has soft magnetic properties and serves to record a signal on a magnetic disk 12. The return pole 3 is disposed on the trailing side of the main pole 2. The junction 4 connects the respective upper portions of the main and return poles 2 and 3 and comprises an insulating layer 7. The side shields 6 are disposed at least partially on the opposite sides of the main pole 2 transversely relative to the track such that they are connected to the return pole 3 and constitute second return poles. The shield 11 is disposed on the leading side of the main pole 2 such that it is connected to the side shields 6 and constitutes a third return pole. The recording coil 5 is disposed such that it is wound around the magnetic core. The distal end surface of the main pole 2 and the respective lower end surfaces of the return pole 3, side shields 6, and shield 11 are exposed in an ABS 43 of a slider 42.

The recording head 56 comprises a nonmagnetic electrically conductive layer 9 and current source 80. The conductive layer 9 is formed between the distal end portion of the main pole 2 and the return pole 3, side shields 6, and shield 11, in the vicinity of the ABS 43, such that it electrically connects these elements. The current source 80 is connected to the main and return poles 2 and 3. The material of the conductive layer 9 may be copper, silver, gold, aluminum, or Nichrome. Only the conductive layer 9 is interposed between the distal end portion of the main pole 2 and the side shields 6 and shield 11. Further, the conductive layer 9 may be recessed from the ABS, or a protective layer, such as a DLC film, may be introduced on the side of that surface of the conductive layer 9 which faces the magnetic disk 12.

In the thirteenth embodiment, an alternating current is passed through the recording coil 5, whereupon data is written to the magnetic disk 12 by means of a magnetic field from the main pole 2. Further, current Iop from the current source 80 is passed through an electrical circuit in which the main pole 2, nonmagnetic electrically conductive layer 9, return pole 3, side shields 6, and shield 11 are connected in series. The reproduction head 54 reproduces the data recorded on the magnetic disk 12.

According to the arrangement described above, current Iop is introduced into the main pole 2 so that transmission-type spin torque is induced in response to magnetization in the main pole. Thereupon, the magnetic domain wall in the main pole 2 is actuated so that magnetization pinning within a pinning site can be canceled and the magnetization responds in the same direction as the direction of main pole magnetization. In this way, a head field can be stably generated from the distal end of the main pole 2. Consequently, the bit-error rate during the Iop supply can be considerably improved.

Since other configurations of the HDDs of the second to fourteenth embodiments are the same as those of the first embodiment, a detailed description thereof is omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the materials, shapes, sizes, etc., of the constituent elements of the head section may be changed if necessary. In the magnetic disk drive, moreover, the numbers of magnetic disks and heads can be increased as required, and the disk size can be variously selected.

What is claimed is:

1. A magnetic head comprising:
   a magnetic core comprising a main pole configured to apply a recording magnetic field perpendicular to a recording layer of a recording medium, and a return pole opposed to the main pole with a magnetic gap therebetween, the return pole configured to return magnetic flux from the main pole and form a magnetic circuit in conjunction with the main pole;
   a coil configured to generate, by a first current, the magnetic flux in the magnetic circuit;
   a nonmagnetic electrically conductive layer formed by disposing a nonmagnetic material in the magnetic gap between the return pole and an end portion of the main pole on a side of the recording medium, and configured to electrically connect the main pole and the return pole; and a wiring configured to supply a second current in series through the main pole, the nonmagnetic electrically conductive layer, and the return pole.

2. The magnetic head of claim 1, wherein the magnetic core comprises a junction configured to magnetically connect the main pole and the return pole, and an insulating layer arranged within the junction to electrically insulate the main pole and the return pole from each other.

3. The magnetic head of claim 2, further comprising second return poles disposed individually on the opposite sides of the main pole transversely relative to a track of the recording medium and magnetically separated from the main pole, the second return poles being connected to the first return pole, wherein the nonmagnetic electrically conductive layer is arranged between an end portion of the main pole on the recording medium side and the return poles.

4. The magnetic head of claim 3, further comprising a third return pole arranged on the leading side of the main pole and magnetically separated from the main pole and the return pole.

5. The magnetic head of claim 1, further comprising second return poles disposed individually on the opposite sides of the main pole transversely relative to a track of the recording medium, magnetically separated from the main pole and connected to the return pole, and a third return pole arranged on the leading side of the main pole and magnetically separated from the main pole and the return pole, wherein the nonmagnetic electrically conductive layer is arranged between an end portion of the main pole on the recording medium side and the third return pole, and the current source is connected to the main pole and the third return pole.

6. The magnetic head of claim 1, wherein the return pole comprises second return poles disposed individually on the opposite sides of the main pole transversely relative to a track of the recording medium, and magnetically separated from the main pole, the nonmagnetic electrically conductive layer is arranged between an end portion of the main pole on the recording medium side and the second return poles, and the current source is connected to the main pole and the second return poles.

7. The magnetic head of claim 6, wherein the return pole comprises a third return pole arranged on the leading side of the main pole and magnetically separated from the main pole and the second return poles, and the nonmagnetic electrically conductive layer is arranged between an end portion of the main pole on the recording medium side and the second and third return poles.

8. A disk drive comprising:
a disk recording medium comprising a magnetic recording layer having a magnetic anisotropy perpendicular to a surface of the medium;
a mechanical unit configured to rotate the recording medium;
a current source; and
a magnetic head configured to process data on the medium, the magnetic head comprising:
a magnetic core comprising a main pole configured to apply a recording magnetic field perpendicular to a recording layer of a recording medium, and a return pole opposed to the main pole with a magnetic gap therebetween, the return pole configured to return magnetic flux from the main pole and form a magnetic circuit in conjunction with the main pole, a coil configured to generate, by a first current, the magnetic flux in the magnetic circuit formed of the main pole and the return pole, a nonmagnetic electrically conductive layer formed by disposing a nonmagnetic material in the magnetic gap between the return pole and an end portion of the main pole on the recording medium side, and configured to electrically connect the main pole and the return pole, and a wiring configured to supply a second current from the current source in series through the main pole, the nonmagnetic electrically conductive layer, and the return pole.

9. The disk drive of claim 8, wherein the magnetic core comprises a junction configured to magnetically connect the main pole and the return pole, and an insulating layer arranged within the junction to electrically insulate the main pole and the return pole from each other.

10. The disk drive of claim 9, further comprising second return poles disposed individually on the opposite sides of the main pole transversely relative to a track of the recording medium and magnetically separated from the main pole, the second return poles being connected to the first return pole, wherein the nonmagnetic electrically conductive layer is arranged between an end portion of the main pole on the recording medium side and the return poles.

11. The disk drive of claim 10, further comprising a third return pole arranged on the leading side of the main pole and magnetically separated from the main pole and the return pole.

12. The disk drive of claim 8, further comprising second return poles disposed individually on the opposite sides of the main pole transversely relative to a track of the recording medium, magnetically separated from the main pole and connected to the return pole, and a third return pole arranged on the leading side of the main pole and magnetically separated from the main pole and the return pole, wherein the nonmagnetic electrically conductive layer is arranged between an end portion of the main pole on the recording medium side and the third return pole, and the current source is connected to the main pole and the third return pole.

13. The disk drive of claim 8, further comprising a control unit which controls a time period for current supply in which the main pole, the nonmagnetic electrically conductive layer, and the return pole are electrically connected in series and which controls a time period for energizing the coil.

14. The disk drive of claim 13, wherein the control unit comprises a computation unit configured to detect a bit-error rate of a signal recorded on the recording medium and to compare the detected rate with a threshold rate, and a current control unit and a current generation unit each configured to adjust a current to be supplied to the main pole and the time period for the current supply when the bit-error rate is higher than the threshold rate.

15. The disk drive of claim 13, wherein the return pole comprises second return poles disposed individually on the opposite sides of the main pole transversely relative to a track of the recording medium, and magnetically separated from the main pole, the nonmagnetic electrically conductive layer is arranged between an end portion of the main pole on the recording medium side and the second return poles, and the current source is connected to the main pole and the second return poles.

16. The disk drive of claim 15, wherein the return pole comprises a third return pole arranged on the leading side of the main pole and magnetically separated from the main pole and the second return poles, and the nonmagnetic electrically conductive layer is arranged between an end portion of the main pole on the recording medium side and the second and third return poles.

* * * * *